US 9,227,646 B2

(12) United States Patent
Stauff et al.

(10) Patent No.: US 9,227,646 B2
(45) Date of Patent: Jan. 5, 2016

(54) SHOPPING CART WITH REMOVABLE BASKET ASSEMBLY

(75) Inventors: Rick Stauff, Plymouth, WI (US); Gary Vande Berg, Fox Lake, WI (US); Roy Watson, Lisbon, OH (US)

(73) Assignee: Bemis Manufacturing Company, Sheboygan Falls, WI (US)

( * ) Notice: Subject to any disclaimer, the term of this patent is extended or adjusted under 35 U.S.C. 154(b) by 283 days.

(21) Appl. No.: 13/609,070

(22) Filed: Sep. 10, 2012

(65) Prior Publication Data

US 2013/0140778 A1 Jun. 6, 2013

Related U.S. Application Data

(60) Provisional application No. 61/532,716, filed on Sep. 9, 2011, provisional application No. 61/660,984, filed on Jun. 18, 2012.

(51) Int. Cl.
*B62B 3/02* (2006.01)
*B62B 3/14* (2006.01)
*B29C 69/00* (2006.01)
*B62B 3/18* (2006.01)
*B29C 45/14* (2006.01)
(Continued)

(52) U.S. Cl.
CPC . *B62B 3/02* (2013.01); *B29C 45/14* (2013.01); *B29C 69/00* (2013.01); *B62B 3/142* (2013.01); *B62B 3/1468* (2013.01); *B62B 3/1476* (2013.01); *B62B 3/1484* (2013.01); *B62B 3/1492* (2013.01); *B62B 3/1496* (2013.01); *B62B 3/18* (2013.01); *B62B 5/067* (2013.01); *B29C 45/1706* (2013.01); *B29C 45/2675* (2013.01); *B62B 5/064* (2013.01); *B62B 2501/04* (2013.01); *B62B 2501/065* (2013.01); *Y10T 29/49622* (2015.01)

(58) Field of Classification Search
CPC .......... B62B 3/02; B62B 3/1476; B62B 3/18; B29C 69/00
USPC ............. 280/33.991, 33.992, 33.996, 33.997, 280/47.34, 47.35, 47.371, DIG. 4; 29/897.2
See application file for complete search history.

(56) References Cited

U.S. PATENT DOCUMENTS 2,479,530 A * 8/1949 Watson .................... B62B 3/14
                                                206/519
2,556,532 A     6/1951 Goldman
(Continued)

FOREIGN PATENT DOCUMENTS

AU          4797885      4/1986
AU       581928 B2    3/1989
(Continued)

OTHER PUBLICATIONS

PCT/US2012/054514 Written Opinion of the International Preliminary Examining Authority dated Sep. 18, 2013 (14 pages).
(Continued)

*Primary Examiner* — Brodie Follman
(74) *Attorney, Agent, or Firm* — Michael Best & Friedrich LLP

(57) ABSTRACT

A method of making a shopping cart includes forming a frame capable of supporting a plurality of basket assembly types, selecting from the plurality of basket assembly types a first basket assembly defining a first basket assembly type; and connecting the first basket assembly to the frame.

10 Claims, 21 Drawing Sheets

(51) Int. Cl.
    *B62B 5/06*       (2006.01)
    *B29C 45/17*      (2006.01)
    *B29C 45/26*      (2006.01)

(56)         References Cited

U.S. PATENT DOCUMENTS

| | | | |
|---|---|---|---|
| 3,019,953 A | 2/1962 | Martin | |
| 3,026,122 A | 3/1962 | Young | |
| 3,909,034 A | 9/1975 | Trubiano | |
| 4,097,056 A * | 6/1978 | Castellano | B62B 3/14 |
| | | | 280/33.991 |
| 4,616,839 A | 10/1986 | Trubiano | |
| 4,647,055 A * | 3/1987 | Weill | B62B 3/1404 |
| | | | 280/33.992 |
| 4,733,877 A | 3/1988 | Pastien | |
| 4,746,134 A | 5/1988 | Rehrig | |
| 4,922,639 A * | 5/1990 | Rehrig | B62B 3/1408 |
| | | | 280/33.991 |
| 5,199,728 A * | 4/1993 | Hutchison | B62B 3/1404 |
| | | | 280/33.992 |
| 5,331,756 A * | 7/1994 | Rehrig | B62B 3/1408 |
| | | | 280/33.991 |
| 5,435,582 A * | 7/1995 | Davidson | B62B 3/1464 |
| | | | 280/33.992 |
| 5,608,978 A * | 3/1997 | Sawyer | B62B 3/1408 |
| | | | 40/308 |
| 5,791,666 A * | 8/1998 | Mainard | B62B 3/027 |
| | | | 24/458 |
| 5,947,313 A | 9/1999 | Kern et al. | |
| D435,196 S | 12/2000 | Gregor et al. | |
| 6,490,979 B1 | 12/2002 | Pfleger | |
| 6,572,122 B2 | 6/2003 | Johnson et al. | |
| 6,589,458 B2 * | 7/2003 | DeCost | B29C 44/3446 |
| | | | 264/50 |
| 6,644,674 B2 * | 11/2003 | Simard | B62B 3/1468 |
| | | | 280/33.991 |
| 6,705,623 B2 * | 3/2004 | Nadeau | B60B 1/006 |
| | | | 280/33.991 |
| 6,761,364 B2 * | 7/2004 | Murar | B62B 3/14 |
| | | | 280/33.991 |
| 6,923,456 B2 * | 8/2005 | Ryan | B62B 3/1404 |
| | | | 280/33.991 |
| 6,983,944 B2 * | 1/2006 | Bergia | B62B 3/1496 |
| | | | 280/33.991 |
| 7,104,552 B2 * | 9/2006 | Swanson | B62B 3/1496 |
| | | | 280/33.991 |
| D530,478 S | 10/2006 | Splain et al. | |
| D540,998 S | 4/2007 | Splain et al. | |
| 7,216,875 B2 * | 5/2007 | O'Quin | B62B 3/1404 |
| | | | 280/33.991 |
| D546,021 S | 7/2007 | Splain et al. | |
| 7,237,782 B2 | 7/2007 | Tucker et al. | |
| 7,240,910 B2 | 7/2007 | Stuemke | |
| 7,255,271 B2 | 8/2007 | Ulrich et al. | |
| D550,423 S | 9/2007 | Splain et al. | |
| D556,413 S | 11/2007 | Splain et al. | |
| 7,303,198 B2 * | 12/2007 | Higgins | B60B 33/0007 |
| | | | 280/33.991 |
| 7,322,582 B2 * | 1/2008 | Prather | B62B 3/14 |
| | | | 280/33.991 |
| 7,384,049 B2 | 6/2008 | Peota et al. | |
| 7,398,976 B2 | 7/2008 | Splain et al. | |
| D575,472 S | 8/2008 | Splain et al. | |
| 7,407,169 B2 | 8/2008 | Splain et al. | |
| 7,410,178 B2 | 8/2008 | Splain et al. | |
| 7,416,194 B2 | 8/2008 | Splain et al. | |
| D582,122 S | 12/2008 | Splain et al. | |
| 7,494,135 B2 | 2/2009 | Ash et al. | |
| D588,774 S | 3/2009 | Peota et al. | |
| D588,775 S | 3/2009 | Peota et al. | |
| D591,474 S | 4/2009 | Peota et al. | |
| 7,600,763 B2 | 10/2009 | Splain et al. | |
| D607,173 S | 12/2009 | Selvig et al. | |
| 7,766,347 B2 * | 8/2010 | Ryan | B62B 3/144 |
| | | | 280/30 |
| 7,780,036 B2 | 8/2010 | Splain et al. | |
| 7,780,902 B2 | 8/2010 | Pruitt, Jr. et al. | |
| D623,374 S | 9/2010 | Splain et al. | |
| 7,793,948 B2 | 9/2010 | Splain et al. | |
| 7,959,166 B2 | 6/2011 | Splain et al. | |
| D641,532 S | 7/2011 | Peota et al. | |
| D643,175 S | 8/2011 | Peota et al. | |
| D644,810 S | 9/2011 | Peota et al. | |
| 8,056,909 B2 | 11/2011 | Burdwood et al. | |
| 8,066,291 B2 | 11/2011 | Cagan et al. | |
| 8,096,564 B2 * | 1/2012 | Berthiaume | B29C 45/1704 |
| | | | 280/33.992 |
| D656,288 S | 3/2012 | Walter | |
| 8,256,792 B2 | 9/2012 | Conrad et al. | |
| 8,282,119 B1 | 10/2012 | Caksa | |
| 8,313,114 B1 | 11/2012 | Aron | |
| D683,102 S | 5/2013 | Muscara | |
| D684,744 S | 6/2013 | Walter | |
| 8,684,371 B2 * | 4/2014 | Berthiaume | B29C 45/1704 |
| | | | 280/33.992 |
| D710,562 S * | 8/2014 | Stauff | B29C 45/1704 |
| | | | D34/27 |
| D714,011 S | 9/2014 | Fredendall et al. | |
| D714,012 S | 9/2014 | Fredendall et al. | |
| D733,388 S | 6/2015 | Stauff et al. | |
| 2002/0020976 A1 * | 2/2002 | Nadeau | B62B 3/144 |
| | | | 280/33.991 |
| 2002/0020977 A1 | 2/2002 | Johnson et al. | |
| 2002/0074753 A1 | 6/2002 | Thalhofer et al. | |
| 2003/0057666 A1 * | 3/2003 | Murar | B62B 3/14 |
| | | | 280/33.991 |
| 2003/0116933 A1 * | 6/2003 | Nadeau | B60B 1/006 |
| | | | 280/33.991 |
| 2003/0132612 A1 | 7/2003 | Pike et al. | |
| 2004/0104549 A1 * | 6/2004 | Bergia | B62B 3/1496 |
| | | | 280/33.991 |
| 2004/0111320 A1 | 6/2004 | Schlieffers | |
| 2005/0087944 A1 * | 4/2005 | Higgins | B60B 33/0007 |
| | | | 280/33.991 |
| 2005/0189731 A1 * | 9/2005 | Swanson | B62B 3/1496 |
| | | | 280/33.991 |
| 2005/0242549 A1 | 11/2005 | Longenecker et al. | |
| 2006/0157946 A1 | 7/2006 | Stuemke | |
| 2006/0181062 A1 | 8/2006 | Robinson | |
| 2006/0186620 A1 | 8/2006 | Tucker et al. | |
| 2007/0063463 A1 | 3/2007 | Splain et al. | |
| 2007/0063464 A1 | 3/2007 | Splain | |
| 2007/0126207 A1 | 6/2007 | Rojas et al. | |
| 2007/0210541 A1 | 9/2007 | Johnson | |
| 2008/0111328 A1 | 5/2008 | Ryan | |
| 2008/0164640 A1 * | 7/2008 | Pruitt | B29C 45/14549 |
| | | | 264/513 |
| 2008/0211200 A1 * | 9/2008 | Eberlein | B62B 3/02 |
| | | | 280/33.991 |
| 2008/0309037 A1 * | 12/2008 | Hebert | B62B 3/1404 |
| | | | 280/33.992 |
| 2009/0033118 A1 | 2/2009 | Gomez | |
| 2009/0058024 A1 | 3/2009 | Cagan et al. | |
| 2009/0159402 A1 | 6/2009 | Webster | |
| 2009/0160146 A1 | 6/2009 | Berthiaume et al. | |
| 2009/0242355 A1 | 10/2009 | Webster | |
| 2010/0038886 A1 | 2/2010 | Greger et al. | |
| 2010/0102523 A1 * | 4/2010 | Deal | B62B 3/1472 |
| | | | 280/33.992 |
| 2010/0194064 A1 | 8/2010 | Simonson et al. | |
| 2010/0200629 A1 | 8/2010 | Reynolds | |
| 2010/0230934 A1 | 9/2010 | Fine | |
| 2010/0276899 A1 | 11/2010 | Burdwood et al. | |
| 2010/0276909 A1 | 11/2010 | Liu | |
| 2011/0062675 A1 | 3/2011 | Brown | |
| 2011/0147164 A1 | 6/2011 | Webster | |
| 2011/0148076 A1 | 6/2011 | Chen | |
| 2012/0074826 A1 * | 3/2012 | Klaus | A47B 95/02 |
| | | | 312/405 |
| 2012/0097721 A1 | 4/2012 | Winterhalter et al. | |
| 2012/0161406 A1 | 6/2012 | Mersky | |
| 2012/0304440 A1 * | 12/2012 | Berthiaume | B29C 45/1704 |
| | | | 29/428 |
| 2013/0038036 A1 | 2/2013 | Lester | |

(56) References Cited

U.S. PATENT DOCUMENTS

| | | | | |
|---|---|---|---|---|
| 2013/0140778 A1* | 6/2013 | Stauff | ............... | B62B 3/1476 |
| | | | | 280/33.996 |
| 2013/0153616 A1* | 6/2013 | Geva | ............... | B62B 3/02 |
| | | | | 224/401 |
| 2013/0255736 A1 | 10/2013 | Horst | | |
| 2013/0300076 A1* | 11/2013 | Berthiaume | ....... | B29C 45/1704 |
| | | | | 280/33.997 |
| 2013/0300090 A1 | 11/2013 | Wang | | |

FOREIGN PATENT DOCUMENTS

| | | | |
|---|---|---|---|
| CA | 2314774 A1 | 1/2002 | |
| DE | 3305378 A1 | 9/1984 | |
| DE | 3419488 A1 | 11/1985 | |
| DE | 102004048623 | 4/2006 | |
| DE | 102007060983 A1 | 6/2009 | |
| DE | 102009042287 | 3/2011 | |
| EP | 0364655 A2 | 4/1990 | |
| EP | 0937625 | 8/1999 | |
| EP | 1400428 A1 | 3/2004 | |
| EP | 1591341 A2 | 11/2005 | |
| FR | 2863997 | 6/2005 | |
| GB | 962378 | 7/1964 | |
| GB | 1007453 A | 10/1965 | |
| GB | 2316368 A | 2/1998 | |
| JP | 3266770 | 11/1991 | |
| JP | 2012218502 A | 11/2012 | |
| KR | 20120037780 A | 4/2012 | |
| WO | 99/58438 | 11/1999 | |
| WO | 01/81064 | 11/2001 | |
| WO | 2013112644 A1 | 8/2013 | |

OTHER PUBLICATIONS

International Search Report and Written Opinion for Application No. PCT/US2012/054514 dated Feb. 7, 2013 (25 pages).
EP14167584.3 Extended European Search Report dated Jun. 25, 2014 (8 pages).
EP14167583.5 Extended European Search Report dated Jun. 25, 2014 (8 pages).
PCT/US2012/054514 International Preliminary Report on Patentability and Written Opinion dated Dec. 4, 2013 (41 pages).
International Invitation To Pay Additional Fees and Partial International Search for Application No. PCT/ US2012/054514 dated Dec. 12, 2012 (8 pages).
International Search Report and Written Opinion for Application No. PCT/US2014/029474 dated Sep. 23, 2014 (24 pages).

* cited by examiner

SHOPPING CART WITH REMOVABLE BASKET ASSEMBLY

RELATED APPLICATIONS

This application claims the benefit of prior-filed, co-pending U.S. Provisional Patent Application No. 61/532,716, filed Sep. 9, 2011 and U.S. Provisional Patent Application No. 61/660,984, filed Jun. 18, 2012, the entire contents of both of which are incorporated herein by reference.

BACKGROUND OF THE INVENTION

The present invention relates to shopping carts, and particularly to the manufacture of shopping carts.

Conventional shopping cart frames are formed from glass-filled nylon, which is relatively expensive, but has previously been needed in order to meet standards for load and durability for shopping carts. Retail stores often have different needs for their respective shopping carts, requiring manufacturers to provide various cart sizes, shapes, and configurations in order to satisfy various retail stores. The wide variety of carts causes the manufacturer to develop separate tool molds for each of the cart types, resulting in significant costs for the manufacturer.

SUMMARY

In one embodiment, the invention provides a method of making a shopping cart. The method includes forming a frame capable of supporting a plurality of basket assembly types, selecting from the plurality of basket assembly types a first basket assembly defining a first basket assembly type; and connecting the first basket assembly to the frame.

In another embodiment, the invention provides a shopping cart including a frame supported for movement over the ground, a first handle, and a first basket assembly connected to the frame. The frame includes an upright portion and is capable of supporting a plurality of basket assembly types. The first handle is connected to the upright portion. The first basket assembly defines a first basket assembly type.

In yet another embodiment, the invention provides a shopping cart including a frame supported for movement over the ground, a first handle, and a first basket assembly. The frame includes an upright portion, and the first handle is connected to the upright portion. The first basket assembly includes a basket frame for supporting a plurality of basket wall types, and one of the plurality of basket wall types attached to the basket frame.

In still another embodiment, the invention provides a flat cart including a frame supported for movement over the ground and a deck that is pivotably connected to the frame. The frame includes a base defining a longitudinal axis and an upright portion including a handle. The deck is pivotable about a pivot axis transverse to the longitudinal axis between a lowered position and an upright position.

In still another embodiment, the invention provides a shopping cart having a front end and a rear end. The cart includes a first basket supported for movement over a floor or the ground and configured to be loaded from the rear, and a handle for pushing the cart.

In still another embodiment, the invention provides a shopping cart having a front end and a rear end and defining a cart axis therebetween. The cart includes a first basket supported for movement over a floor or the ground and a handle for pushing the cart, the handle being pivotable.

In yet another embodiment, the invention provides a shopping cart having a front end and a rear end and defining a cart axis therebetween. The cart includes a handle for pushing the cart, a first basket including a moveable first gate, and a second basket including a moveable second gate.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
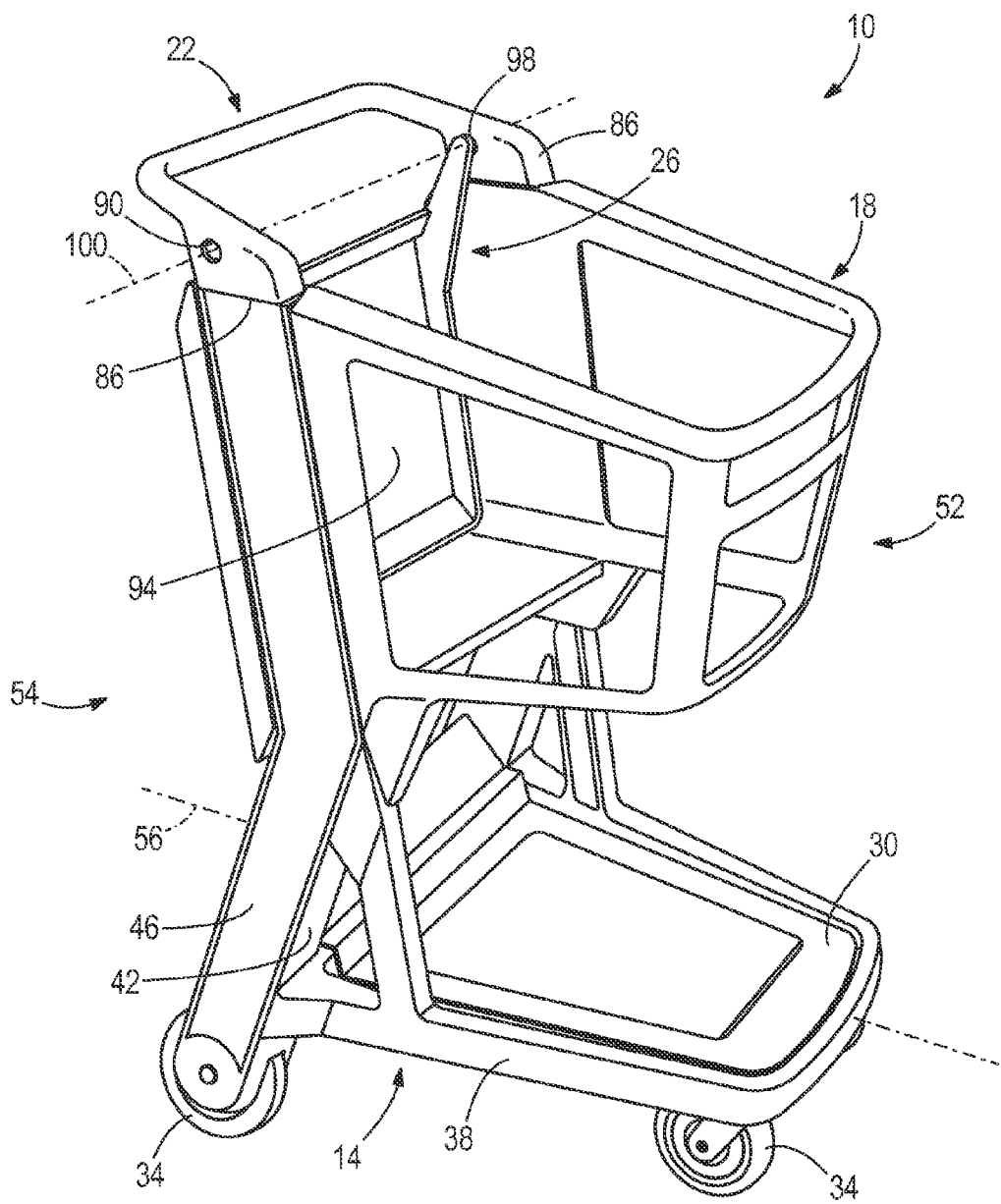
FIG. 1 is a perspective view of a shopping cart.
Figure 4:
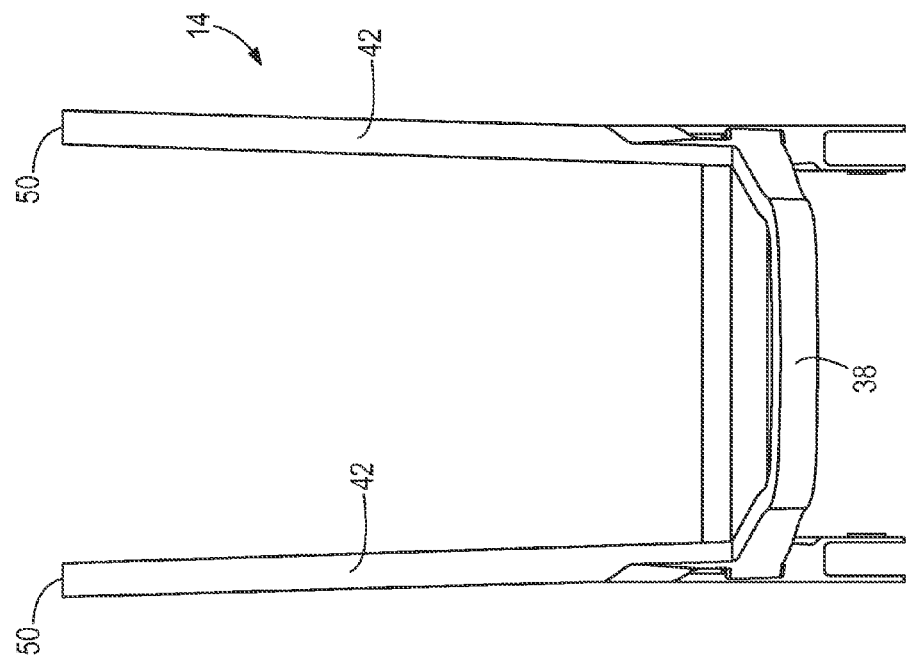
FIG. 4 is a front view of the frame of FIG. 3.
Figure 3:
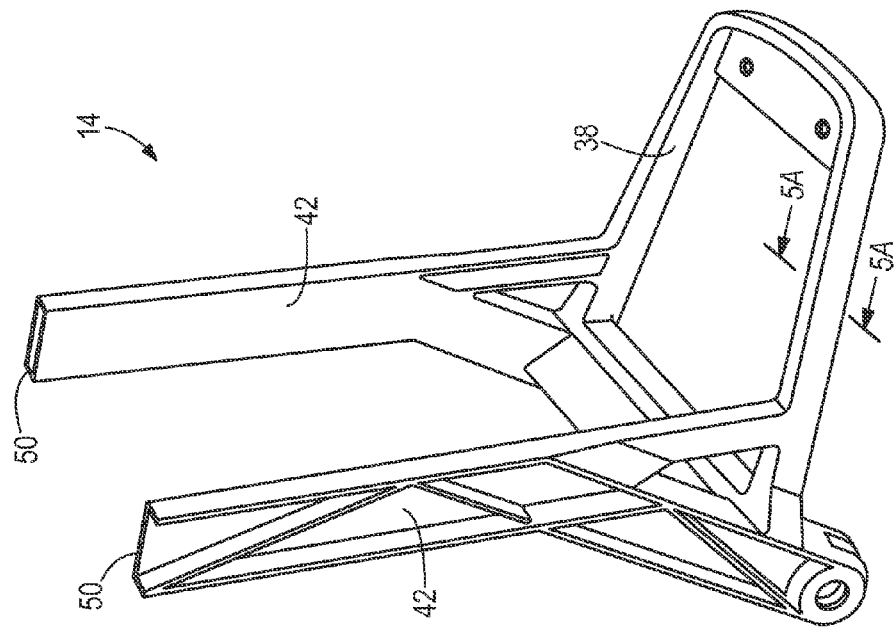
FIG. 3 is a perspective view of a frame.

FIG. 1 discloses a shopping cart 10. The shopping cart 10 includes a frame 14, a basket assembly 18, a handle 22, a rear gate 26, a lower tray 30, and multiple wheels 34 supporting the frame 14 for movement over the ground. In the embodiment shown in FIGS. 1-4, the frame 14 forms a U-shaped member including a base 38, uprights or arms 42 extending upwardly from the base 38, and a cover 46 connected to each arm 42. As best shown in FIG. 4, each arm 42 includes an upper end 50 positioned away from the base 38. The arms 42 taper inwardly from the upper ends 50, such that the distance between the arms 42 proximate the base 38 is less than the distance between the upper ends 50 of the arms 42. The cart 10 defines a front end 52, a rear end 54 opposite the front end 52, and a horizontal cart axis 56 extending between the front end 52 and the rear end 54. As used herein, the term "rearward" refers to a direction that extends toward the rear end 54, and the term "forward" refers to a direction that extends toward a front end 52.

Figure 5A:
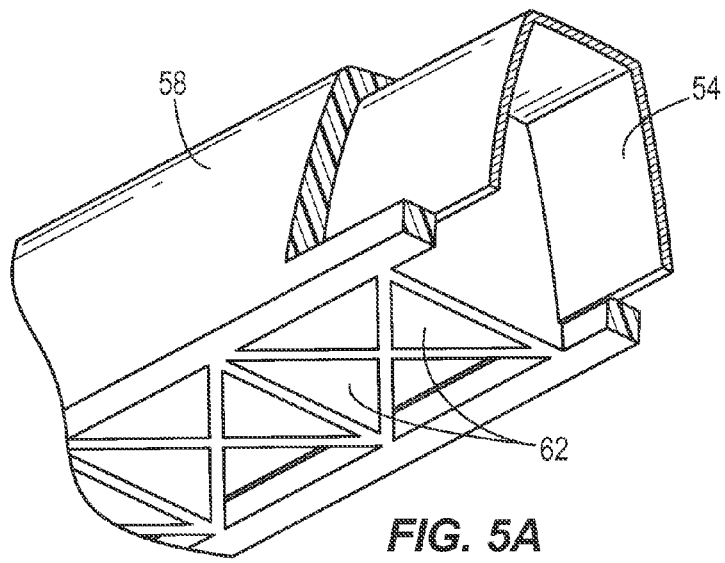
FIG. 5A is a perspective view of a cross-section of the frame of FIG. 4 taken along line 5A-5A.
Figure 5B:
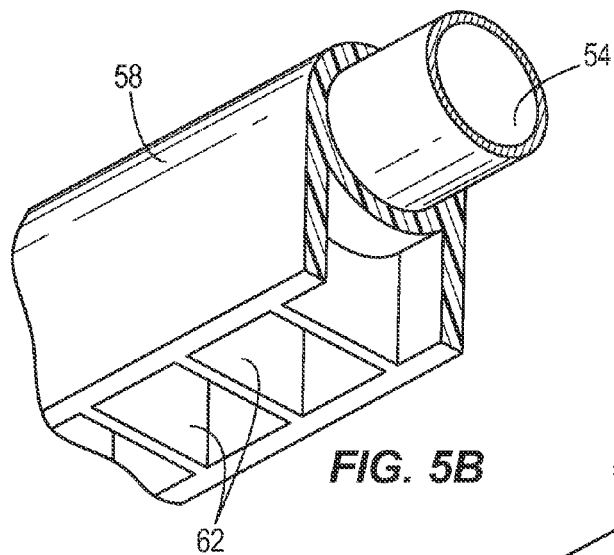
FIG. 5B is a perspective view of a cross-section of the frame of FIG. 4 according to another embodiment.
Figure 5C:
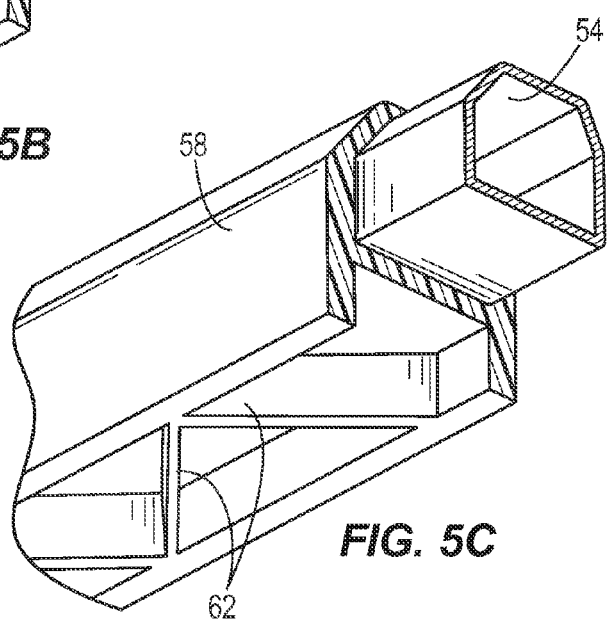
FIG. 5C is a perspective view of a cross-section of the frame of FIG. 4 according to another embodiment.

The frame 14 is formed by a combination of over-molding and gas-assist plastic forming processes. As shown in FIG. 5A, a substrate 58 such as a piece of metal is over-molded by plastic material 60. Although the substrate 58 in FIG. 5A has a cross-section that is U-shaped, the substrate 58 can be formed into various other shapes, including a round tube (FIG. 5B) or an enclosed piece that is partially hexagonal and partially rectangular (FIG. 5C). In the illustrated embodiments, the plastic material 60 near the substrate 58 is molded as a lattice structure having ribs 62 for increased rigidity. In one embodiment, the substrate 58 is made from steel, although in other embodiments the substrate could be made from another material. The plastic material 60 may include any type of injection-molded plastic. The gas-assist process creates at least one hollow cavity (not shown) in the plastic material 60. This combination process yields a frame 14 that is both strong and low weight. The substrate 58 and the geometric relationship between the substrate 58 and the plastic 60 increases rigidity over a simple injection-molded plastic. The combination process satisfies the load and durability standards, is less expensive than conventional glass-filled nylon processes, and provides a frame 14 having a lower density than the glass-filled nylon frames. In one embodiment, a frame 14 made using the combination process costs about $0.60 per pound and has a lower density, whereas a frame made from glass-filled nylon costs about $2 per pound and has a higher density.

Figure 2:
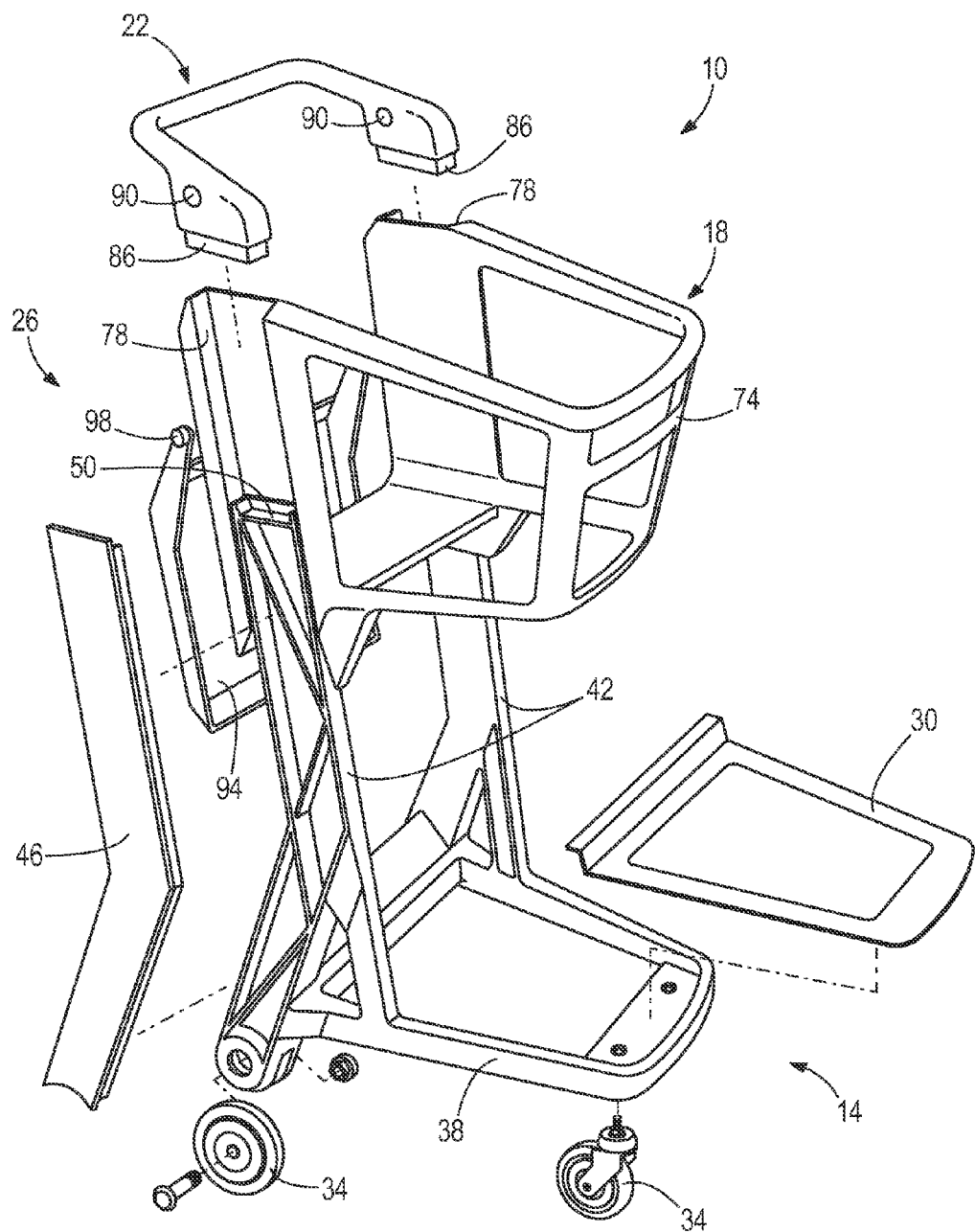
FIG. 2 is an exploded view of the shopping cart of FIG. 1.
Figure 12:
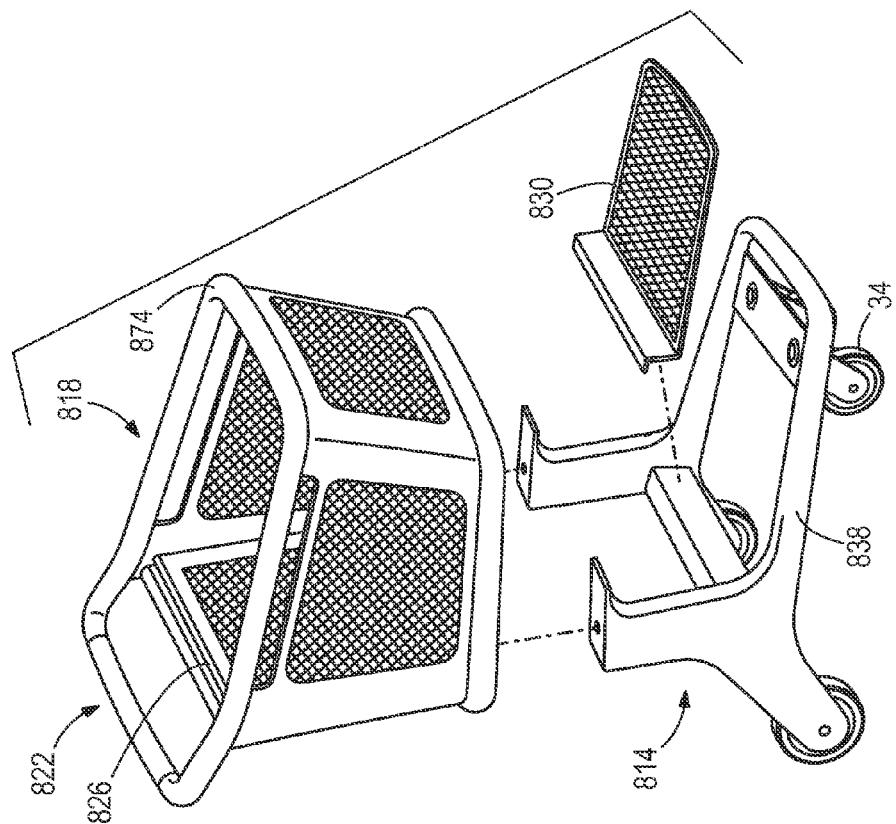
FIG. 12 is a perspective view of a shopping cart according to another embodiment.

Referring to FIG. 2, the basket assembly 18 is removably coupled to the frame 14 and includes a basket frame 74 and a pair of slots 78 on either side of the basket frame 74. The slots 78 receive the upper ends 50 of the arms 42. The walls and bottom surface of the basket assembly 18 have been removed for purposes of clarity; the basket assembly 18 also includes basket walls similar to those shown in FIGS. 12-13 and FIG. 22. The basket assembly 18 is moved onto the arms 42 and slides down along the arms 42 until the basket assembly 18 reaches a predetermined position. In the illustrated embodiment, the predetermined position is the point at which the slots 78 engage the arms 42 in an interference fit due to the inward taper of the arms 42. In other embodiments, the predetermined position may be defined by a detent that locks the basket assembly 18 in place relative to the arms 42, or the basket assembly 18 may be secured relative to the arms 42 by fasteners.

Referring to FIGS. 1 and 2, the handle 22 includes a generally U-shaped member having two ends 86 that are adapted to engage the upper ends 50 of the arms 42. After the basket assembly 18 is secured relative to the frame 14, the handle 22 is coupled to the upper ends 50 of the arms 42, further locking the basket assembly 18 in position. The handle 22 also includes a pair of openings 90 (FIG. 2), each of which is positioned proximate one of the handle ends 86. In the illustrated embodiment, the handle ends 86 are secured to the arms 42 by a snap fit or interference fit.

Figure 7A:
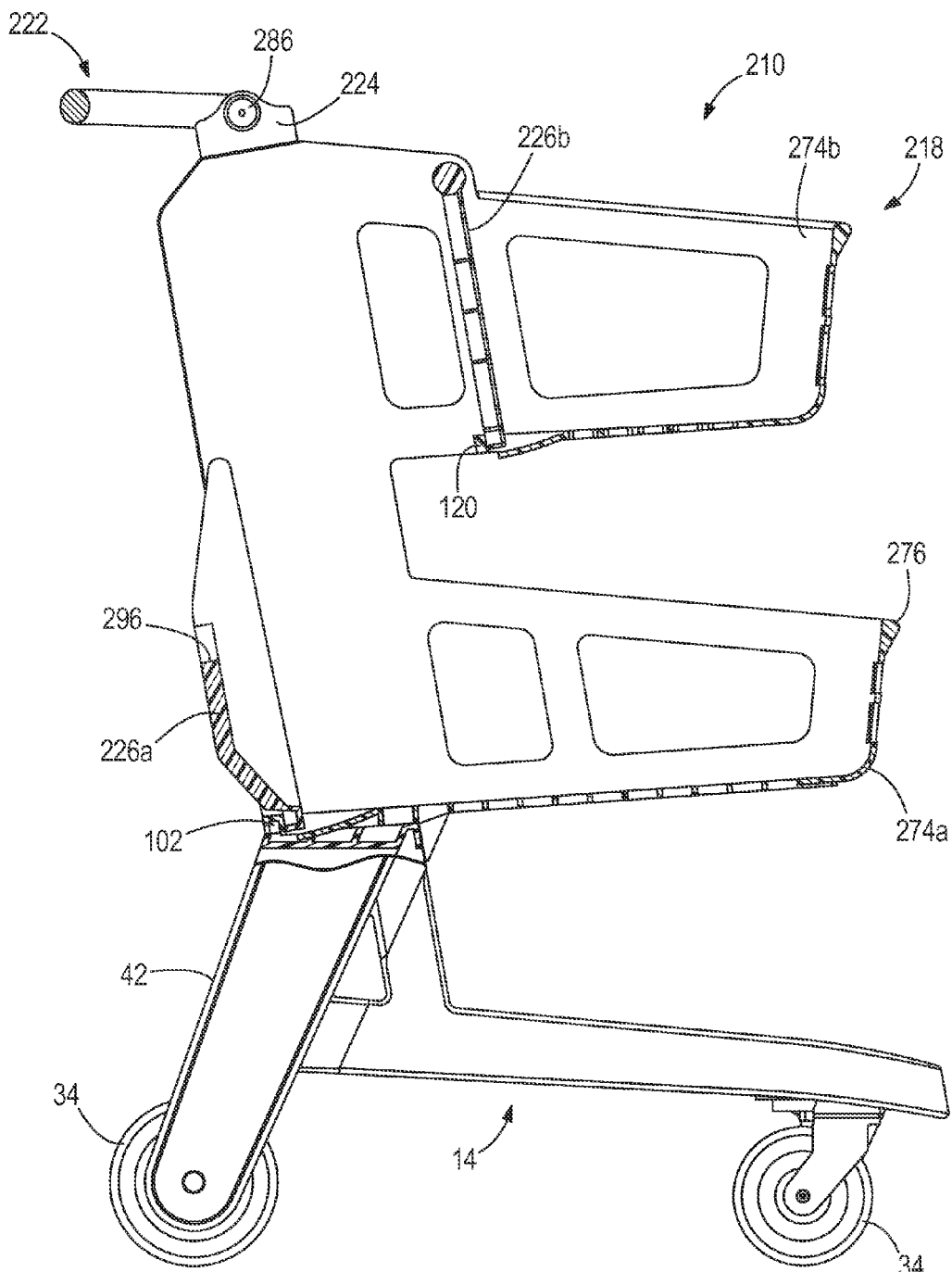
FIG. 7A is a cross-section view of the shopping cart of FIG. 6 taken along line 7A-7A.

The rear gate 26 includes a wall 94 and a pair of gate arms 98 and is positioned proximate the rearward end of the cart 10. The gate arms 98 are positioned on opposite edges of the wall 94 and extends away from the wall 94. In the embodiment shown in FIGS. 1 and 2, each gate arm 98 is positioned within one of the openings 90 on the handle 22. The rear gate 26 is thus pivotably coupled to the handle 22 and pivots about a gate axis 100 transverse to the cart axis 56. When a second cart (not shown) is pushed into the rear of the shopping cart 10, the rear gate 26 pivots upwardly, toward the front of the basket assembly 18 in order to enable the basket assembly of the second cart to nest within the basket assembly 18. In other embodiments, the gate arms 98 may engage openings positioned on the basket assembly 18. The rear gate 26 engages a stop 102 (FIG. 7A) positioned on the basket assembly 18 to prevent the rear gate 26 from pivoting beyond the rearward end of the basket frame 74, i.e., to limit pivoting of the rear gate 26 in a clockwise direction as shown in FIG. 7A.

The frame 14 is capable of supporting multiple types of basket assemblies 18. For example, in an alternative embodiment shown in FIGS. 6-8, a second basket assembly 218 includes multiple basket frames 274 having different sizes and characteristics from the first basket assembly 18. The basket assembly of FIGS. 6-8 includes a first or lower basket 274a and a second or upper basket 274b. In addition, the handle 222 is pivotably coupled to blocks 224 that are coupled to the arms 242. In the illustrated embodiment, the handle 222 is formed as a U-shaped member that is pivotably coupled to the cart 10 at each end 286. The handle 222 is pivotable about a handle axis 228 (FIG. 7B) transverse to the cart axis 256. In other embodiments, the handle 222 may be coupled to the basket assembly 218 or the handle axis 228 may be oriented in a different direction.

Figure 7B:
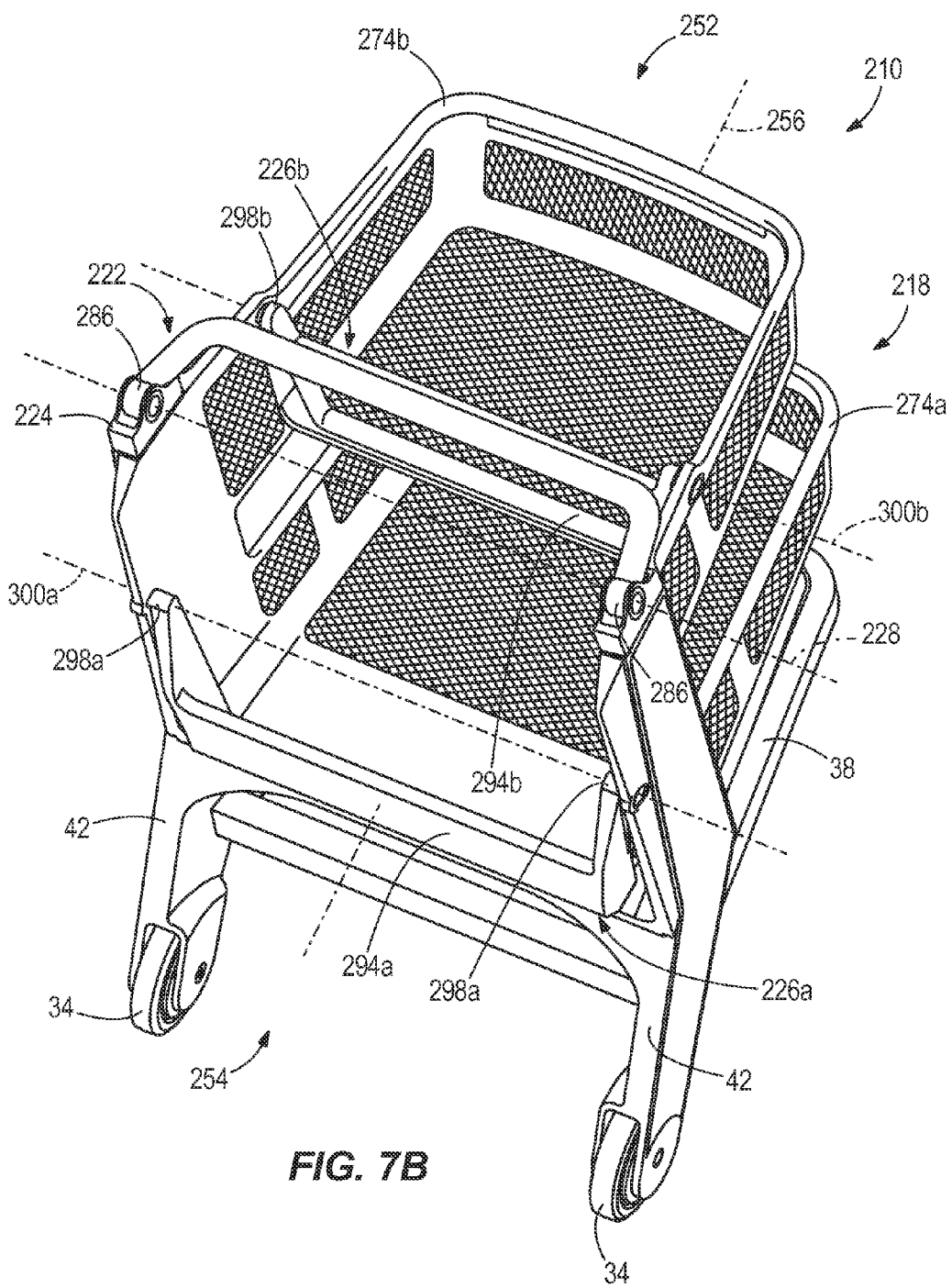
FIG. 7B is a rear perspective view of the shopping cart of FIG. 6.
Figure 8:
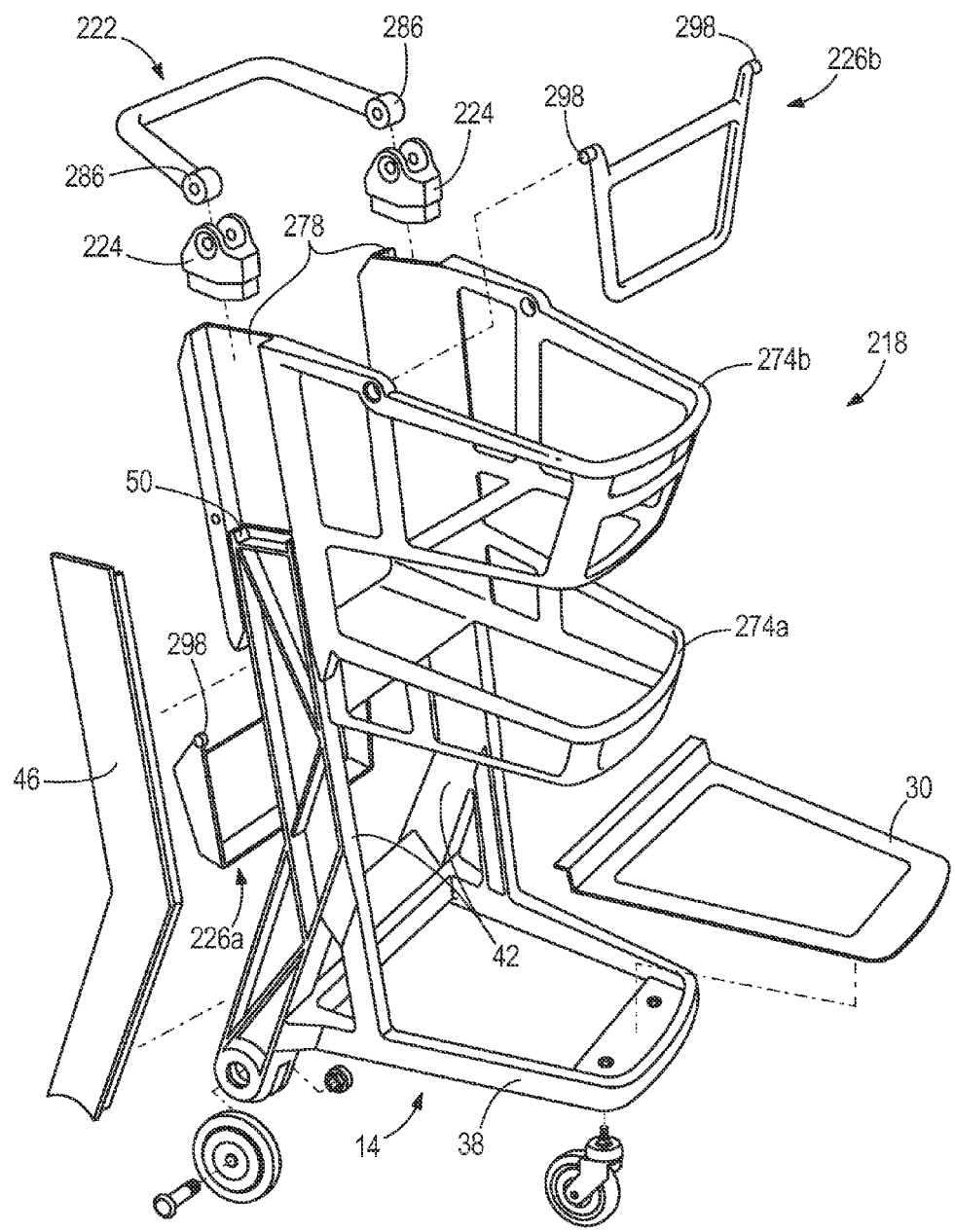
FIG. 8 is an exploded view of the shopping cart of FIG. 6.

Referring to FIG. 7B, the upper basket 274b is substantially above the lower basket 274a. The lower basket 274a includes a first or lower gate 226a proximate the rear end 254 of the cart 210. The lower gate 226a is pivotable about a lower gate axis 300a transverse to the cart axis 256 between a raised position and a lowered position. The lower gate 226a is similar to the rear gate 26 described above with respect to FIGS. 1 and 2. The lower gate 226a includes a wall 294a and a pair of arms 298a for coupling the lower gate 226a to the lower basket 274a. The wall 294a extends across the rearward end of the lower basket 274a when the lower gate 226a is in the lowered position. As shown in FIG. 7A, the wall 294a has an upper end 296 below an upper end 276 of the lower basket 274a when the lower gate 226a is in the lowered position.

As shown in FIG. 7B, the upper basket 274*b* includes a second or upper gate 226*b* proximate the rear end 254 of the cart 210. The upper gate 226*b* is pivotable about an upper gate axis 300*b* transverse to the cart axis 256 between a raised position and a lowered position. The upper gate 226*b* includes a wall 294*b* (FIG. 7B) and a pair of arms 298*b* for coupling the upper gate 226*b* to the upper basket 274*b*. The wall 294*b* extends across a rearward end of the upper basket 274*b* when the upper gate 226*b* is in a lowered position. Both the lower gate 226*a* and the upper gate 226*b* pivot upwardly toward the front of each basket 274*a*, 274*b* to allow the lower basket 274*a* and the upper basket 274*b* to receive a lower basket and upper basket, respectively, of another cart (not shown). The stops 102 (FIG. 7A) prevent the gates 226*a*, 226*b* from pivoting backward beyond the rearward end of each basket 274*a*, 274*b*.

The lower basket 274*a* is configured to be loaded from the rear. As best illustrated in FIGS. 7A and 7B, the lower basket 274*a* is positioned partially behind the upper basket 274*b*, enabling a user to load and unload the lower basket 274*a* from behind the cart 210 and beneath the handle 222. Stated another way, a rearward end of the upper basket 274*b* is positioned forward of a rearward end of the lower basket 274*a* to provide easy access to the contents of the lower basket 274*a* from the rear of the cart 210. In addition, because the upper end 296 of the wall 294*a* is below the upper end 276 of the lower basket 274*a* when the lower gate 226*a* is in the lowered position, it is easier for a user to load and unload the lower basket 274*a*.

Figure 6:
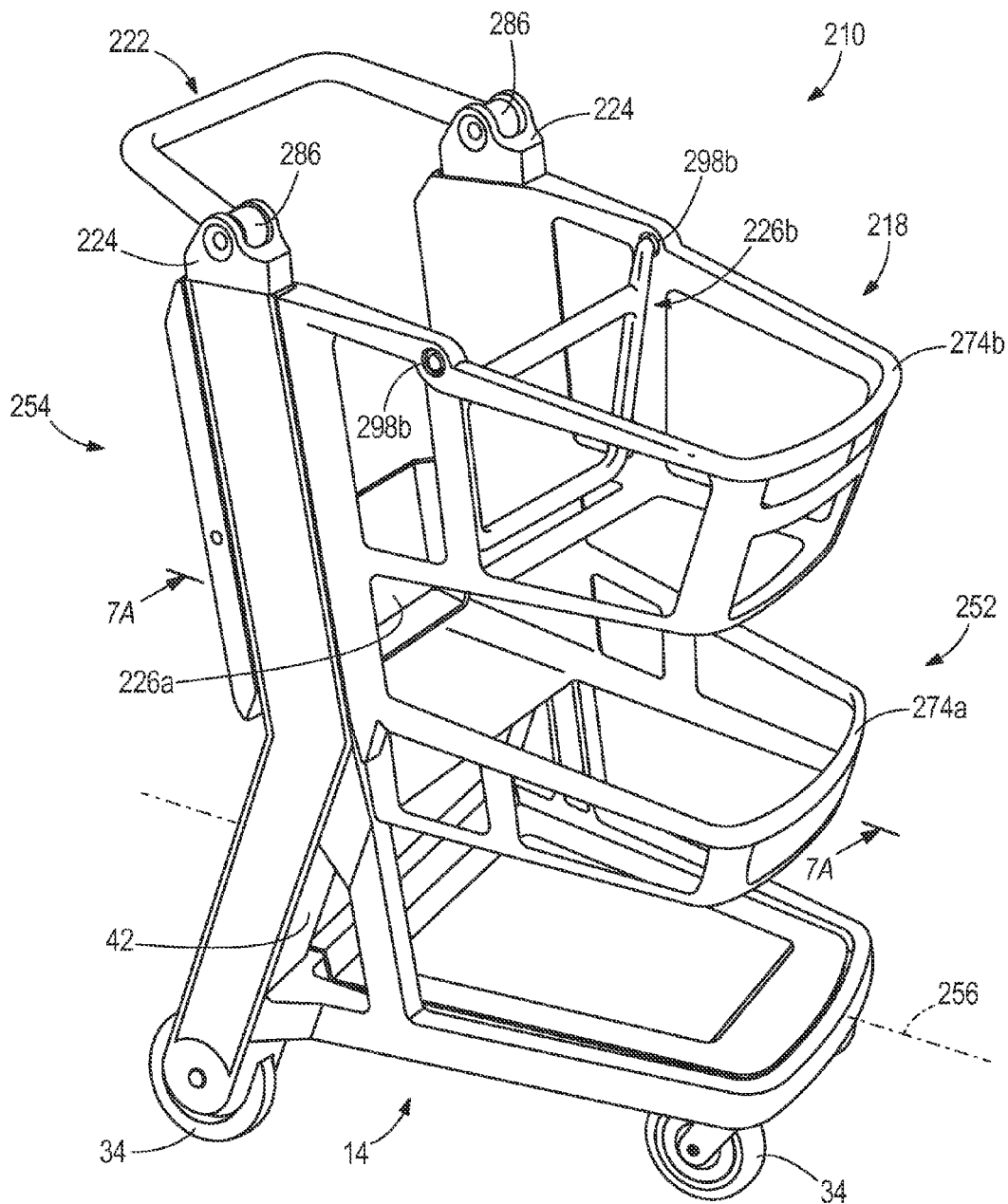
FIG. 6 is a perspective view of a shopping cart according to another embodiment.

The handle 222 is moveable about the handle axis 228 between at least a first or rear position (FIG. 6) and a second or forward position (FIG. 7A). As shown in FIG. 6, in the rear position the handle 222 extends toward the rear end 254 of the cart 210. This configuration allows the user to push the cart 210 with the handle 222. Referring to FIG. 7B, in the forward position the handle 222 extends toward the front end 252 of the cart 210. In the forward position, the handle 222 is substantially aligned with the upper gate 226*b* (see FIG. 7B) and forward of the rearward end of the lower basket 274*a*. This position of the handle 222 improves access to the lower basket 274*a*, allowing the user to more easily load or unload the lower basket 274*a* from the rear. The frame 14 is configured to support many types of basket assemblies 18, so the manufacturer can select a basket assembly 18 from multiple types of basket assemblies 18 in order to customize the cart 10 as necessary. This reduces the need to manufacture many types of carts 10 individually, instead providing a modular approach for manufacturing the carts 10 from similar parts.

Figure 9:
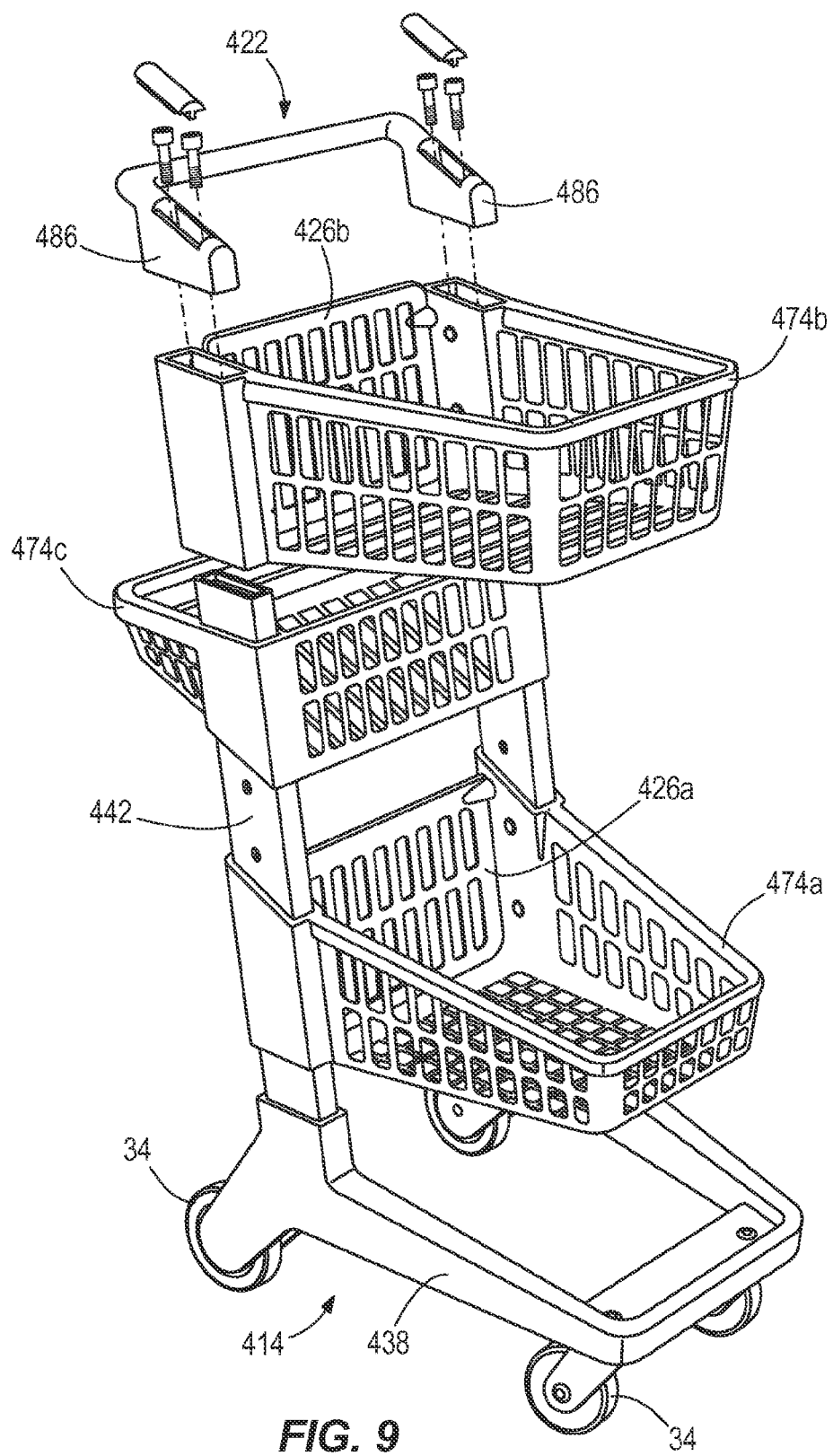
FIG. 9 is an exploded view of a shopping cart according to another embodiment.
Figure 10:
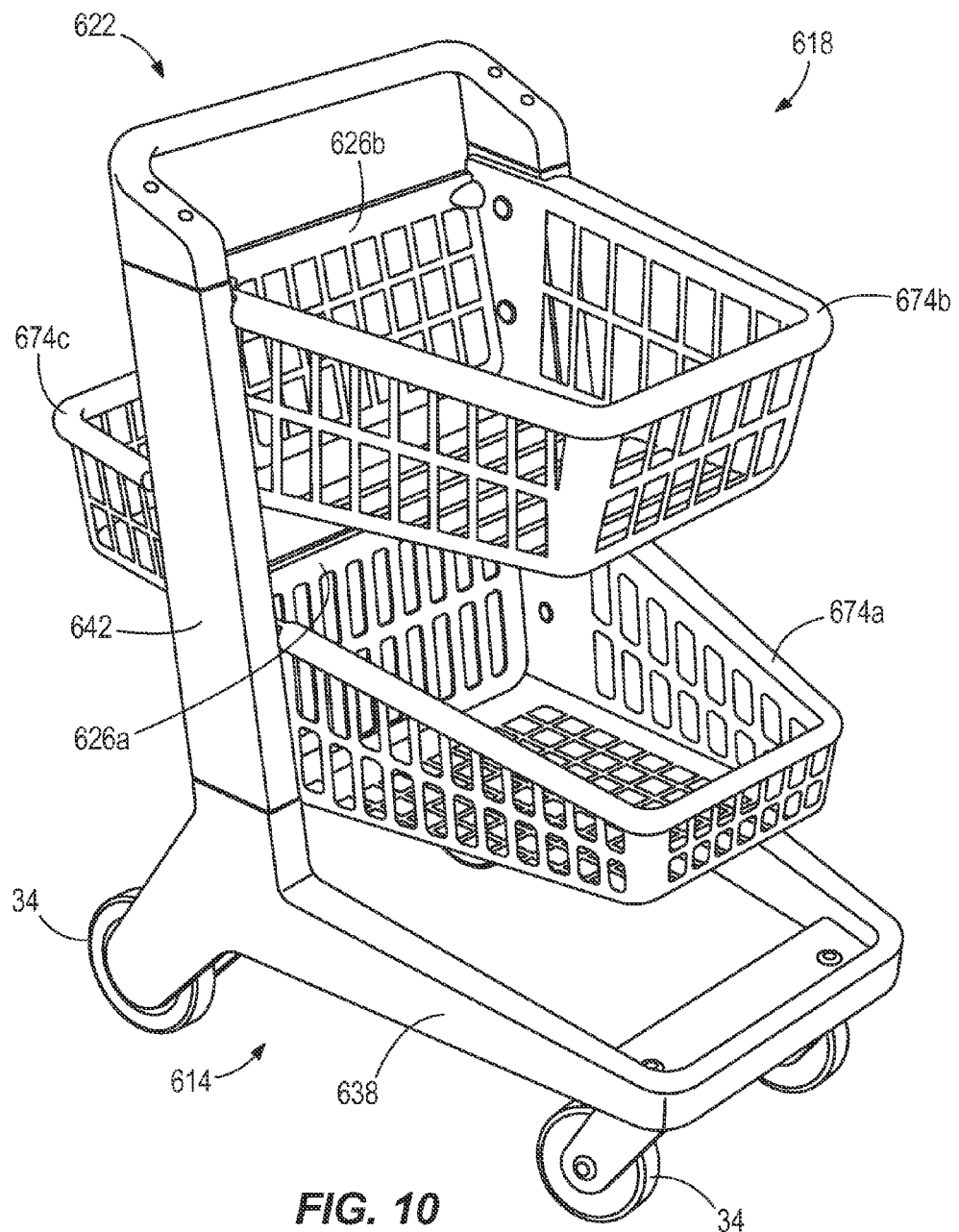
FIG. 10 is a perspective view of a shopping cart according to another embodiment.
Figure 11:
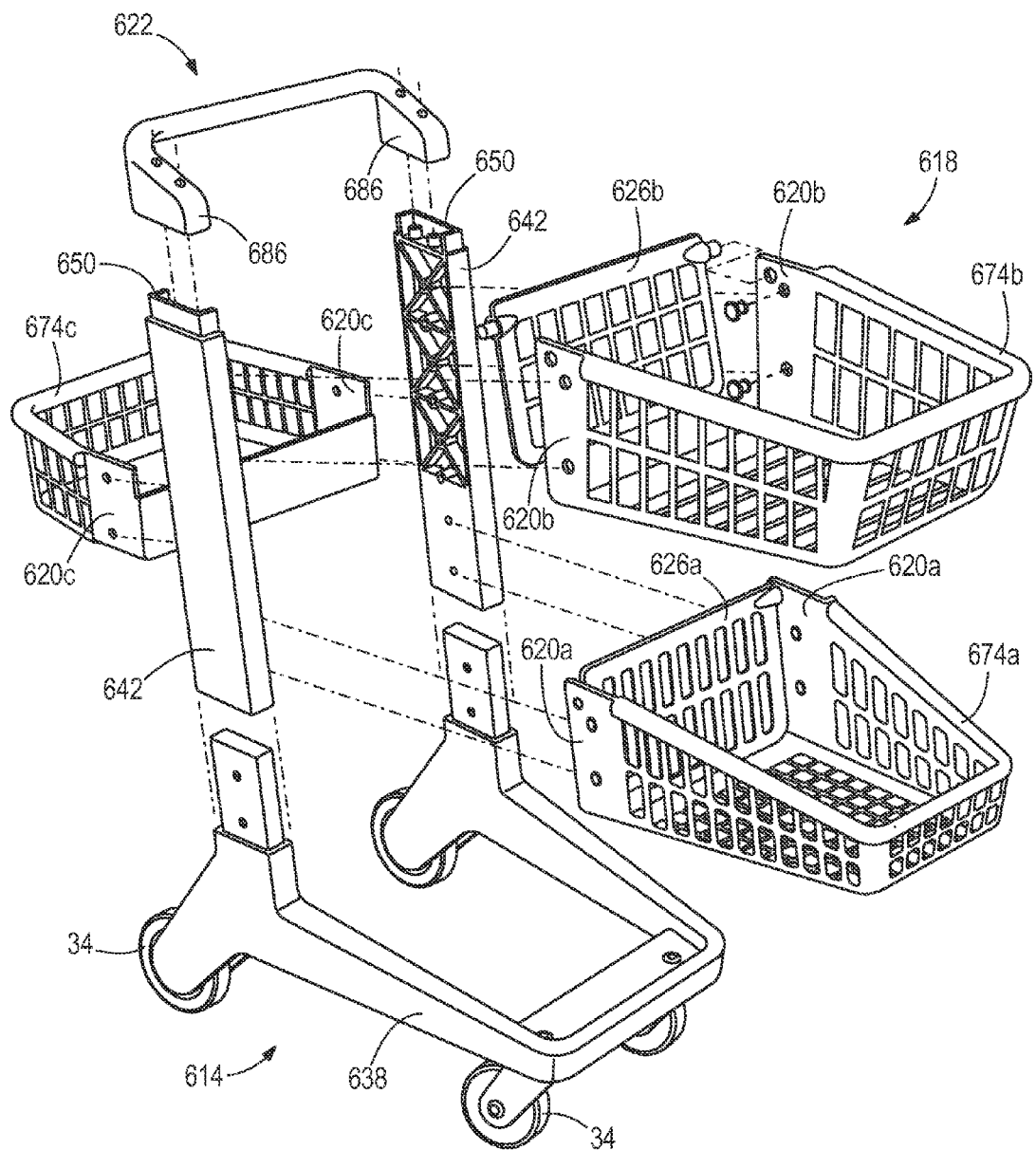
FIG. 11 is an exploded view of the shopping cart of FIG. 10.
Figure 13:
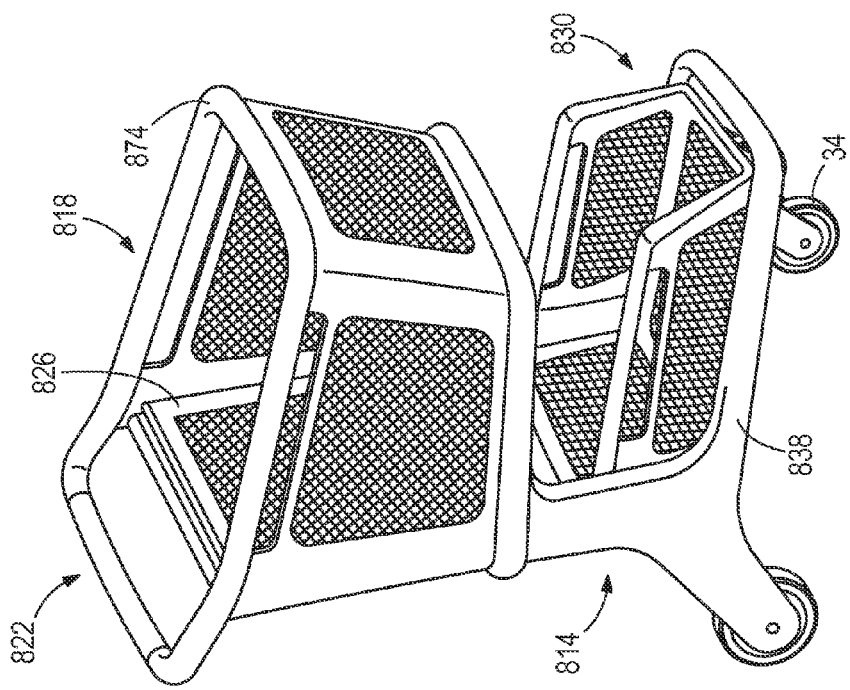
FIG. 13 is a perspective view of a shopping cart according to another embodiment.
Figure 14:
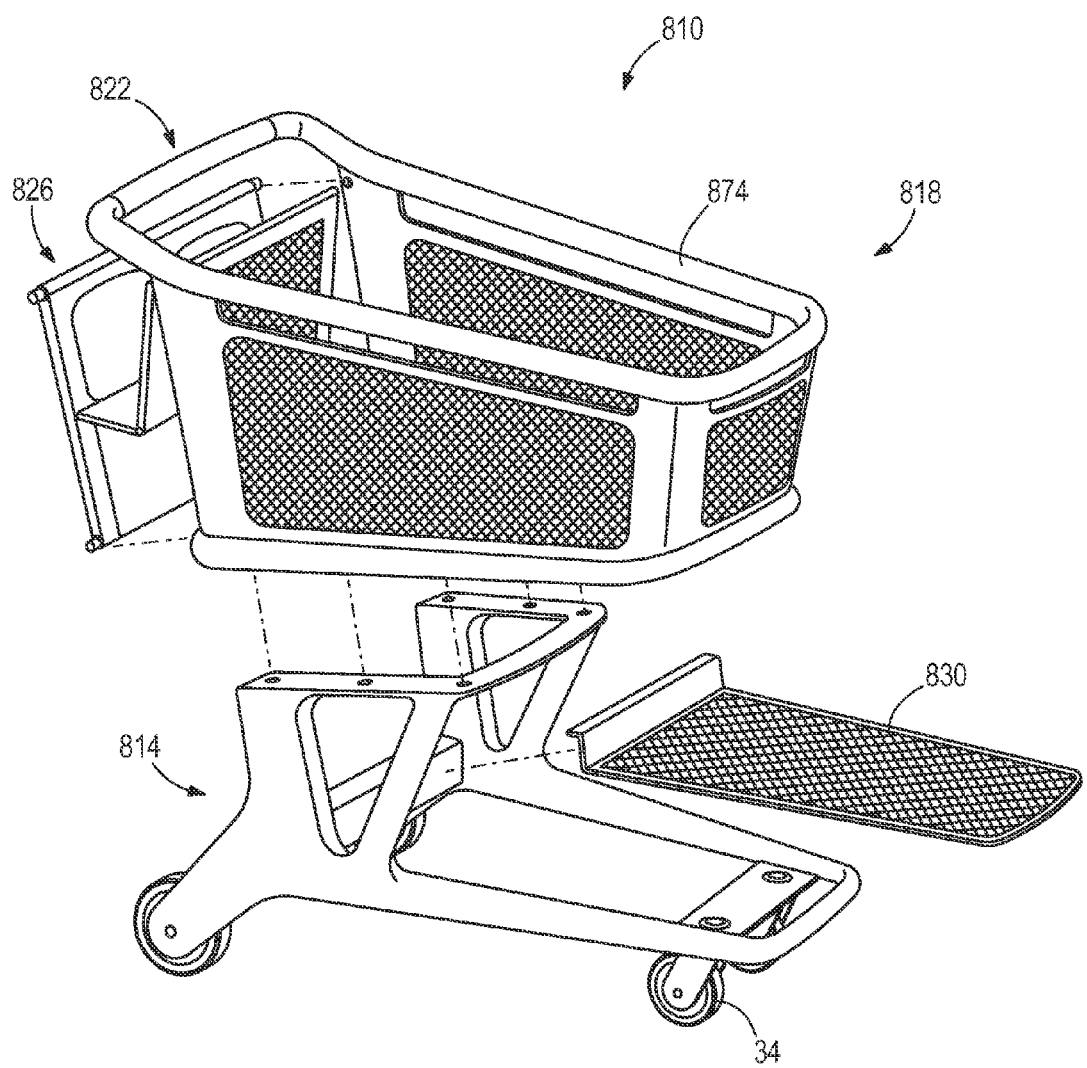
FIG. 14 is a perspective view of a shopping cart according to another embodiment.

In other embodiments, shown in FIG. 9, multiple basket assemblies 418 may be positioned on the arms 442, including one or more rear-facing baskets 474*c*. In this embodiment, the handle 422 includes ends 486 that are coupled to the arms 442 by fasteners such as bolts. Alternatively, as shown in FIGS. 10-11, the arms 642 can be removably received on the frame 614, and the basket assemblies 618 include brackets 620 for coupling each basket assembly 618 to the arms 642. The bracket 620 can be secured to the arms 642 by a snap fit or by fasteners. The alternative embodiments of FIGS. 12-14 also illustrate that the basket assembly 818 can be directly fastened to the frame 814, and the handle 822 may be formed integrally with the basket assembly 818 or the frame 814. In addition, FIG. 13 shows a cart 810 in which the lower tray 830 includes an open-ended basket.

Figure 15:
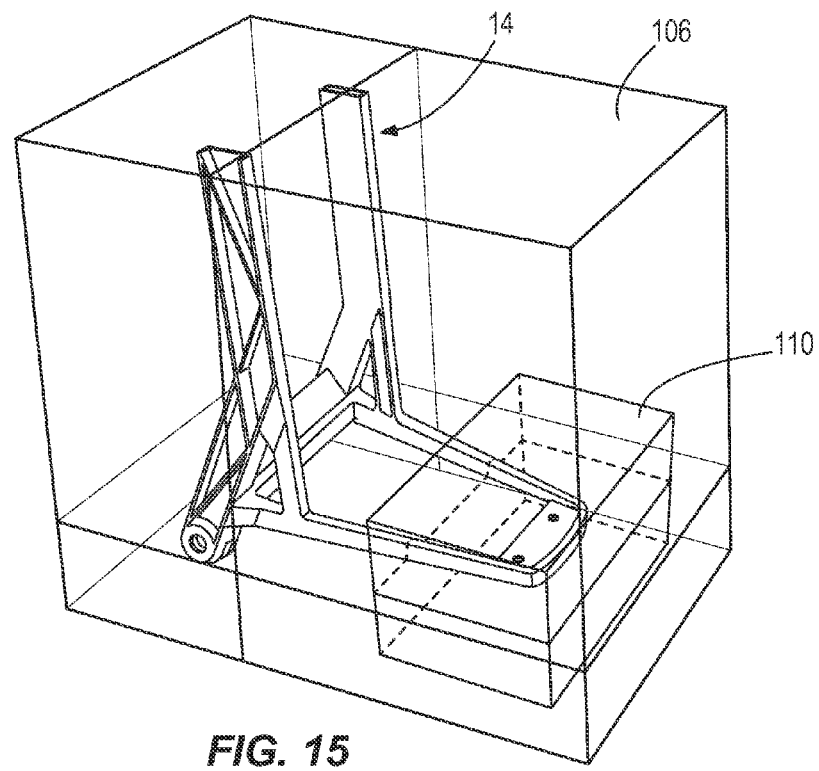
FIG. 15 is a perspective view of a mold.
Figures 16, 17:
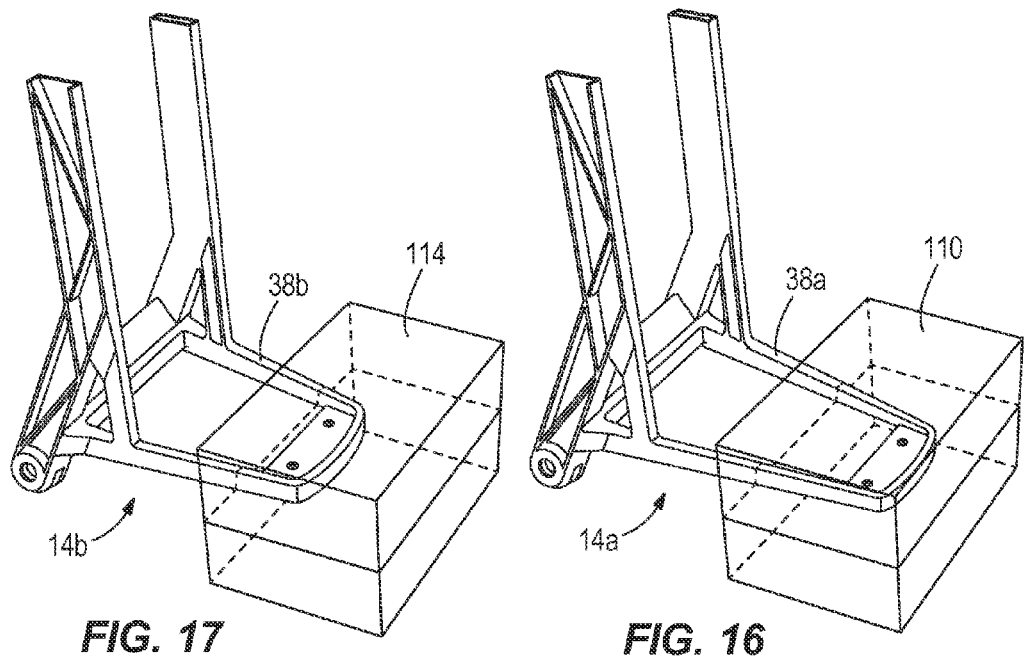
FIG. 16 is a perspective view of a frame portion and a first mold insert.
FIG. 17 is a perspective view of a frame portion and second mold insert.
Figure 19:
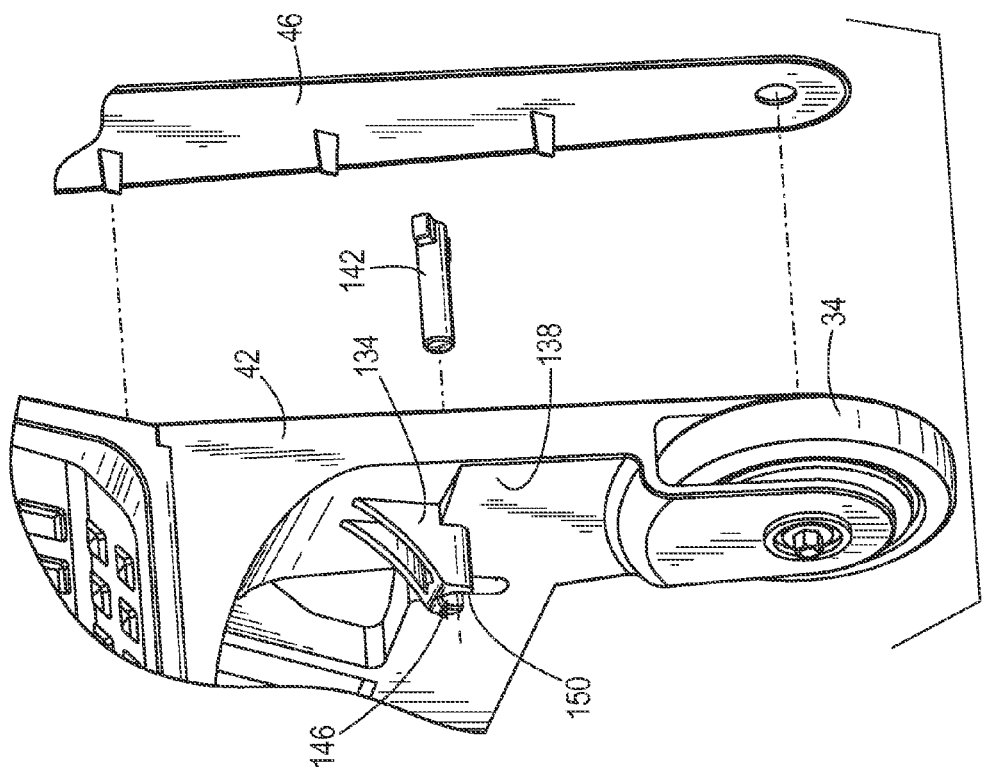
FIG. 19 is an exploded view of the caster lifting mechanism of FIG. 18.
Figure 18:
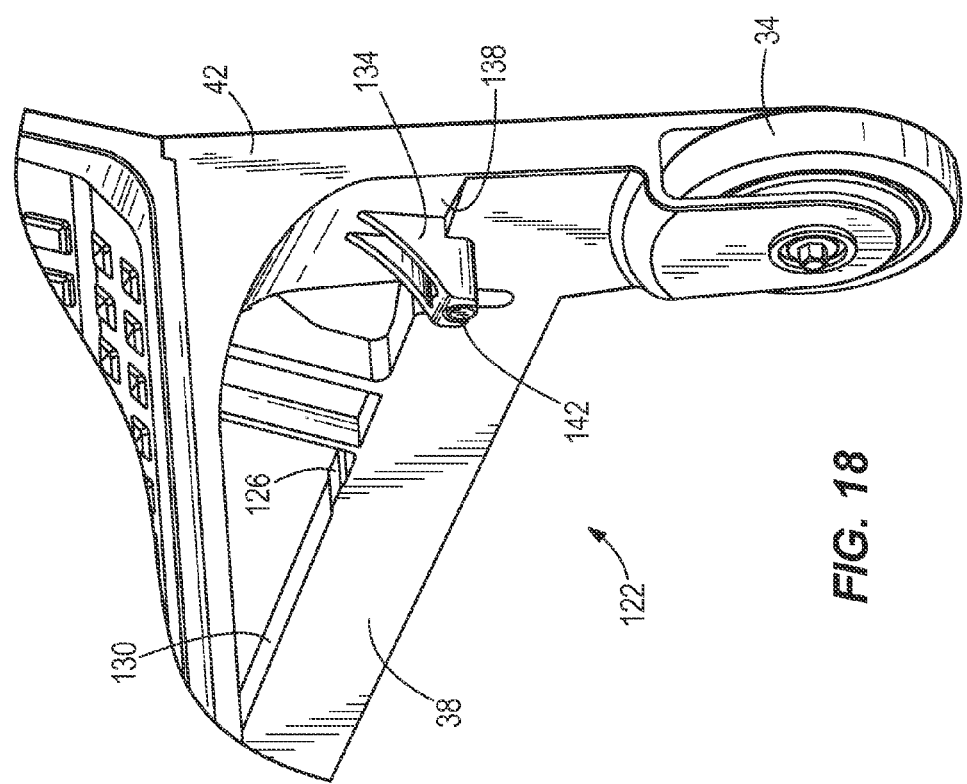
FIG. 18 is a perspective view of a caster lifting mechanism.
Figure 20:
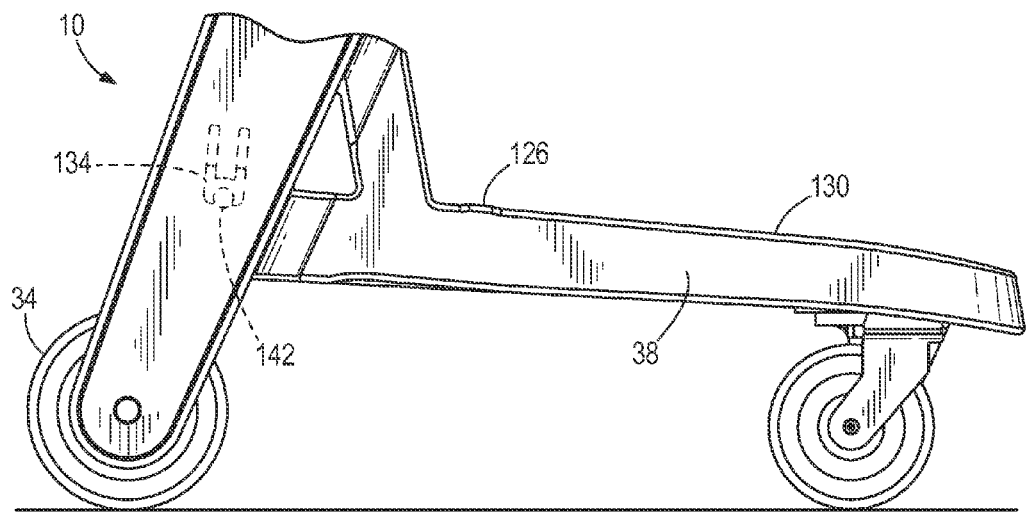
FIG. 20 is a partial side view of a shopping cart.

As shown in FIGS. 15-17, the frame 14 is formed in a mold 106. The mold includes a removable first module or insert 110. In the illustrated embodiment, the first insert 110 forms a portion of the frame base 38. The first insert 110 may be removed from the mold 106 and replaced with a second insert 114 that forms the same portion of the base 38, but the portion of the base 38 has a shorter dimension than the portion that is formed by the first insert 110. In other embodiments, the second insert 114 could provide a different shape for the portion of the base 38. In still other embodiments, the inserts 110, 114 could form a different portion of the frame 14 or another component of the cart 10. The removable inserts 110, 114 enable the operator to readily customize the size and shape of the manufactured frame 14 by changing the configuration of the mold 106. Because the mold 106 is capable of producing various frame configurations, the forming process requires only a single large mold 106 with several smaller inserts like the first insert 110 and second insert 114, rather than multiple large molds for each desired configuration. In this way, tooling costs are reduced.

Figure 21:
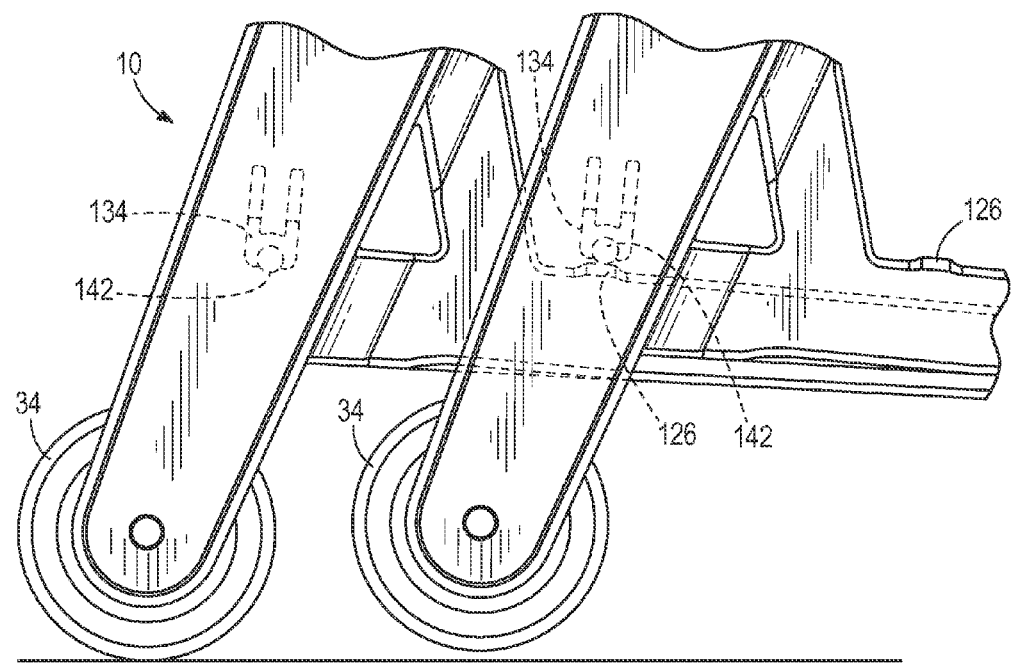
FIG. 21 is a partial side view of a pair of shopping carts nested together.

As shown in FIGS. 18-21, the frame 14 also includes a caster lift mechanism 122 to raise the wheels 34 when the cart 10 is nested or stacked with another cart. The caster lift mechanism 122 includes a ridge 126 formed on an upper surface 130 of the base 38, a housing 134 formed on an inside surface 138 of at least one of the arms 42, and an insert 142 (FIG. 19) positioned within the housing 134 and behind the cover 46. In one embodiment, the insert 142 is made of a wear-resistant plastic material. In the illustrated embodiment the housing 134 extends inwardly or toward the center of the base 38 and forms a cylindrical recess 146. The recess 146 is open at the inner end of the housing 134 and the housing 134 has a longitudinal slot 150 communicating with the bottom of the recess 146. The insert 142 is cylindrical and is inserted into the inner end of the recess 146 such that the lower portion of the insert 142 extends through the slot 150. Referring to FIG. 21, when a second cart is nested into the rear of a first cart 10, the insert 142 from the first cart 10 engages the ridge 126 and causes the rear of the first cart 10 to lift away from the ground. Lifting the rear end of the cart 10 insures that the rear wheels 34 do not contact the ground, thereby reducing the friction between the nested carts 10 and the ground. This reduced contact makes it easier for the nested carts 10 to be pushed and maneuvered together. Over time, the repeated engagement between the ridge 126 and the insert 142 will cause the insert 142 to wear down. The insert 142 provides a replaceable wear surface such that once the insert 142 wears down to a predetermined point, the user can replace the insert 142 to extend the working life of the caster lift mechanism 122.

Figure 22:
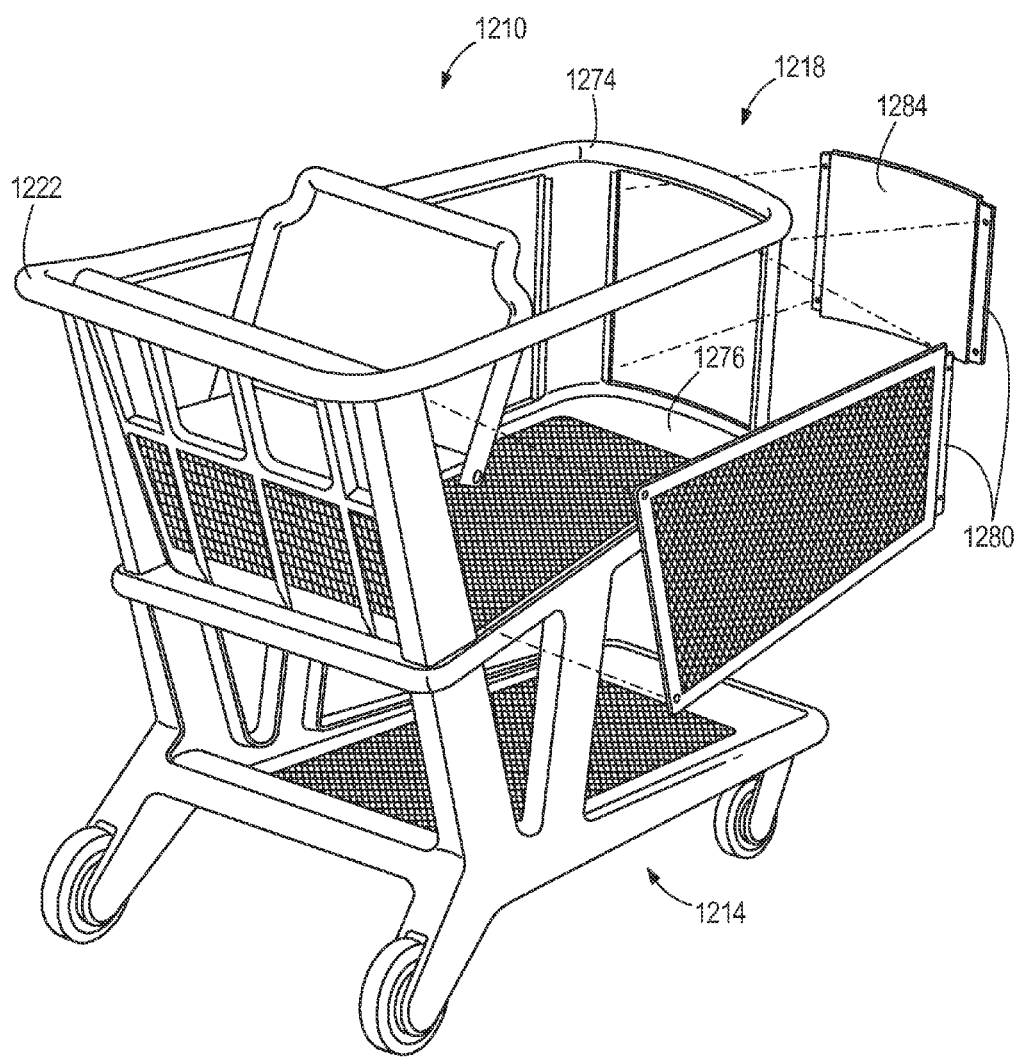
FIG. 22 is an exploded view of a shopping cart according to another embodiment.

In an alternative embodiment, shown in FIG. 22, the cart 1210 includes a basket frame 1274, a bottom surface 1276, and multiple walls 1280. The basket frame 1274 is configured to support multiple types of basket walls 1280 that can be removably coupled to the basket frame 1274. In one embodiment, the basket frame 1274 is molded separately from the walls 1280, and the walls 1280 are coupled to the basket frame 1274 by a snap fit. In other embodiments the walls 1280 are coupled by fasteners. The basket frame 1274 is configured to support many types of basket walls 1280, so the manufacturer can select a basket wall 1280 from many basket wall types in order to customize the cart as necessary. For instance, various walls 1280 may define different mesh patterns or wall cross-sections. This reduces the need to manufacture many types of baskets individually. Instead, the manufacturer can create the same basic frame 1274 and then select a particular wall 1280, thereby implementing a modular approach to manufacturing the basket frames 1274 from similar parts.

Figure 23A:
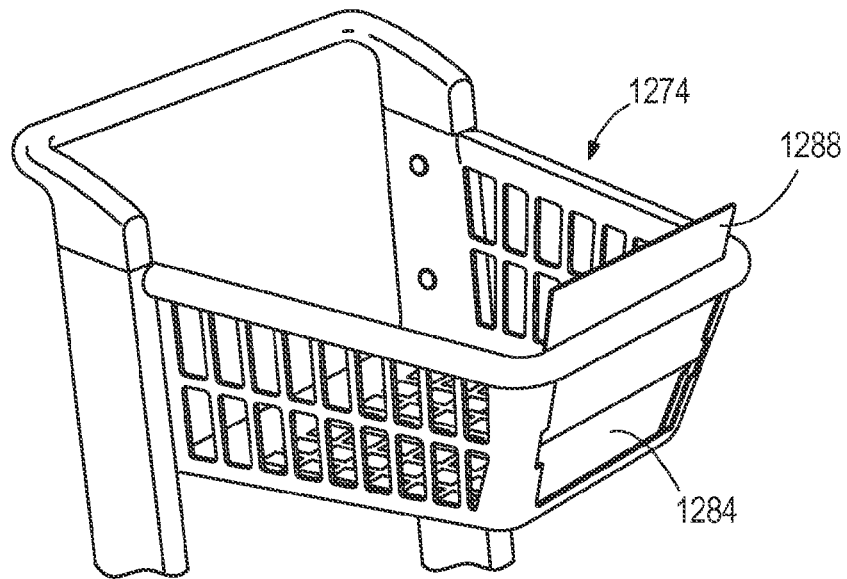
FIG. 23A is a perspective view of a shopping cart basket including a billboard panel.
Figure 23B:
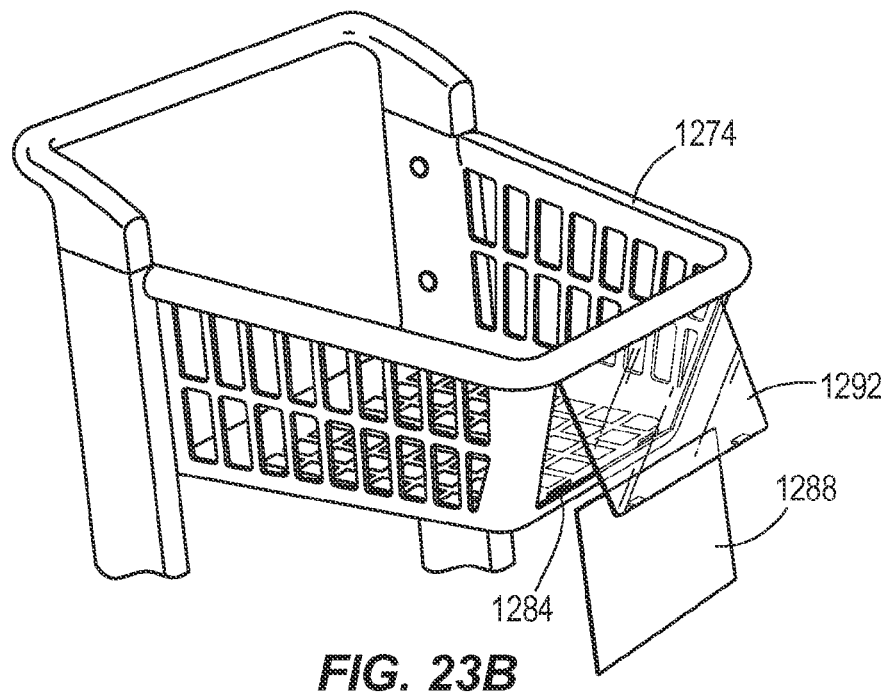
FIG. 23B is a perspective view of a shopping cart basket including a billboard panel according to another embodiment.
Figure 23C:
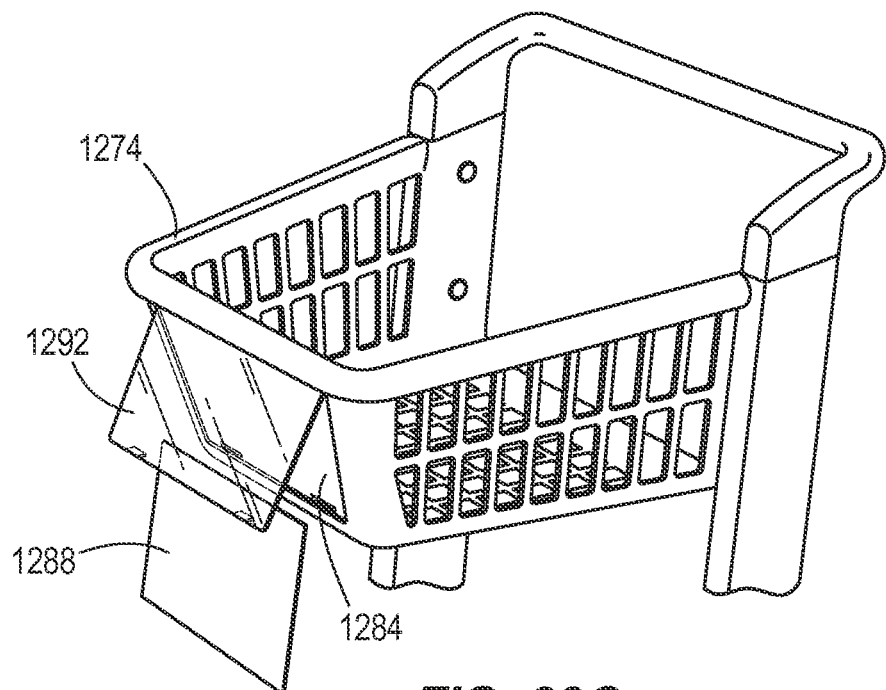
FIG. 23C is a perspective view of a shopping cart basket including a billboard panel according to another embodiment.
Figure 23D:
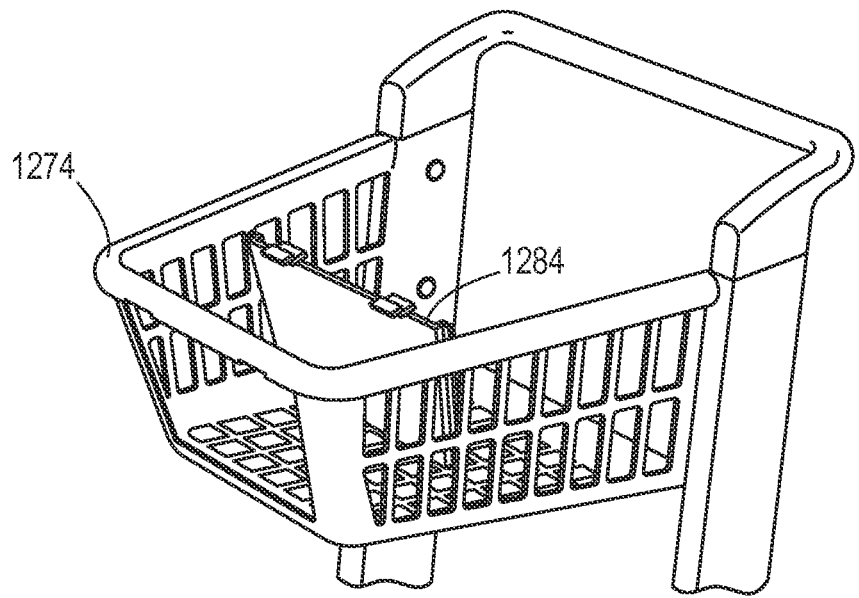
FIG. 23D is a perspective view of a shopping cart basket including a billboard panel according to another embodiment.

The wall 1280 of the basket frame 1274 may also include one or more billboard panels 1284 for displaying graphics or other information. The panels 1284 can be molded with an in-mold graphic foil 1288 (FIG. 23) and changed as desired (for example, seasonally). FIGS. 23A-23D provide various examples of billboard panels 1284. As shown in FIG. 23A, the graphic foil 1288 may be slidably received through the basket frame 1274 and positioned within the billboard panel 1284. Alternatively, FIGS. 23B and 23C show that the panel 1284 may include a transparent window 1292 that is pivotable relative to the basket frame 1274 to allow the graphic foil 1288 to be positioned behind the window 1292. The panel 1284 may also be removably fitted within the basket frame 1274, as shown in FIG. 23D.

Figure 24:
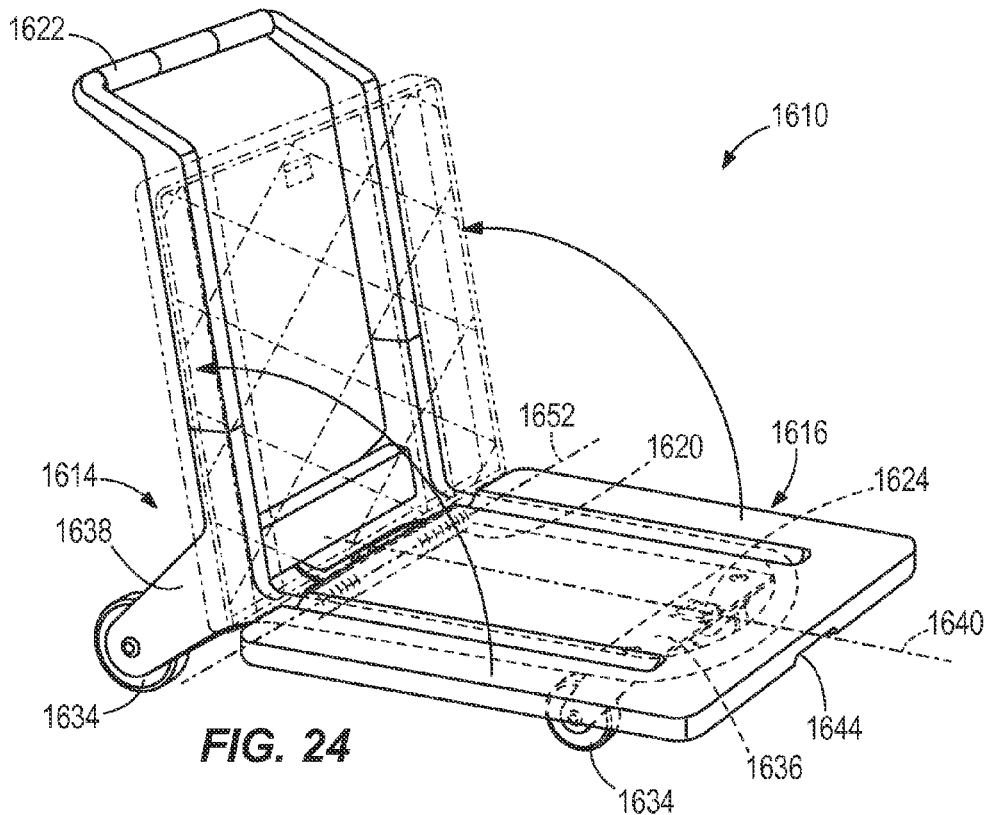
FIG. 24 is a perspective view of a flat-bed cart.

FIG. 24 shows a nesting flat-bed cart 1610. The flat-bed cart 1610 includes a frame 1614, a pivoting load bed or deck 1616, at least one spring-loaded slow-close hinge 1620, and a latch mechanism 1624. In one embodiment, the deck 1616 is made from a non-slip plastic material. The frame 1614 includes a base 1628 having a handle 1622, multiple wheels or casters 1634 coupled to the base for supporting movement of the frame over the ground, and a cross piece 1636. In the illustrated embodiment, the rear wheels 1634 can swivel, while the front wheels 1634 are fixed. The frame 1614 defines a longitudinal axis 1640. The deck 1616 includes a hand grip 1644 and a ribbed underside 1648 (FIG. 27) to provide increased rigidity.

The deck 1616 is pivotably attached to the base 1638 by the spring-loaded slow-close hinge 1620. The deck is pivotable about a pivot axis 1652 transverse to the longitudinal axis 1640. The slow-close hinge 1620 is similar to those used for toilet seats. The spring action of the hinge 1620 biases the deck 1616 toward an upright position as shown in FIG. 24. The latch mechanism 1624 is located on the cross piece 1636 extending between the front wheels 1634. When the deck 1616 is moved to a lowered or use position, the latch mechanism 1624 locks the deck 1616. In one embodiment, the latch mechanism 1624 includes a rotating hook (not shown). The hook may be spring-biased to automatically engage and lock the deck 1616 in place when the deck 1616 is moved to the lowered position. When the latch mechanism 1624 is unlocked, the slow-close hinge 1620 moves the deck 1616 to the upright position. The hand grip 1644 enables the user to assist in lifting the deck 1616 to the upright position. In other embodiments, a heavy spring or gas strut may be used in addition to or in place of the slow-close hinge 1620.

Figure 25:
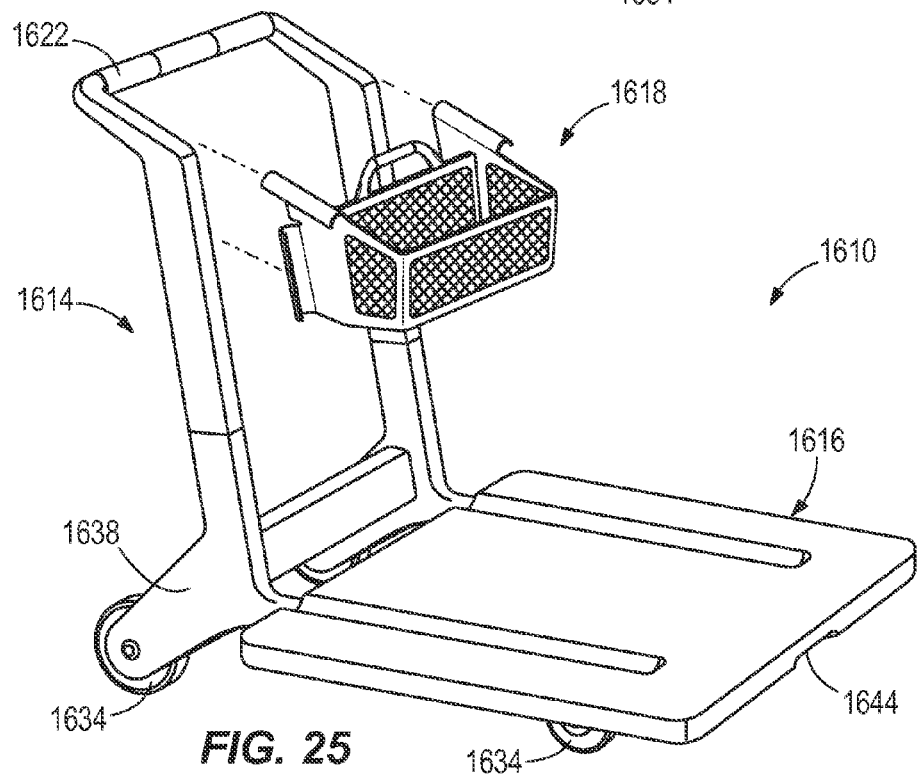
FIG. 25 is a perspective view of a flat-bed cart according to another embodiment.

With the decks 1616 in the upright position, multiple flat-bed carts 1610 can be stacked or nested together in a manner similar to the cart 10 of FIG. 1. That is, the frame of a second flat-bed cart 1610 can be pushed into the first flat-bed cart 1610 from the rear, such that the frames 1614 of the two carts 1610 nest together. The flat-bed cart 1610 of FIG. 24 can be made with a frame 1614 that is similar to the frame 14 of FIG. 1 except with a different handle. In addition, the flat-bed cart 1610 of FIG. 24 can include the caster lift mechanism 122 described above with respect to FIGS. 18-21. In the embodiment shown in FIG. 25, the flat-bed cart 1610 further includes a small basket 1618 that can be removably attached to the handle 1622, such as by a snap fit or by fasteners. The basket 1618 may also be integrally formed with the handle 1622 or frame 1614.

Figure 26:
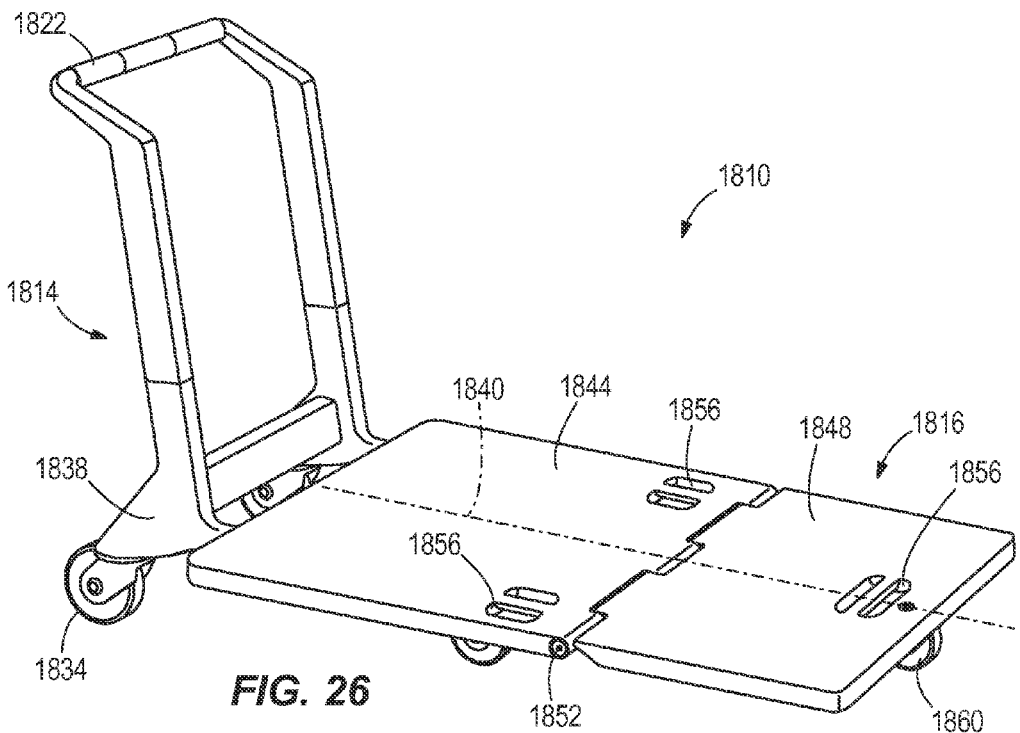
FIG. 26 is a perspective view of a flat-bed cart according to another embodiment in a lowered state.
Figure 27:
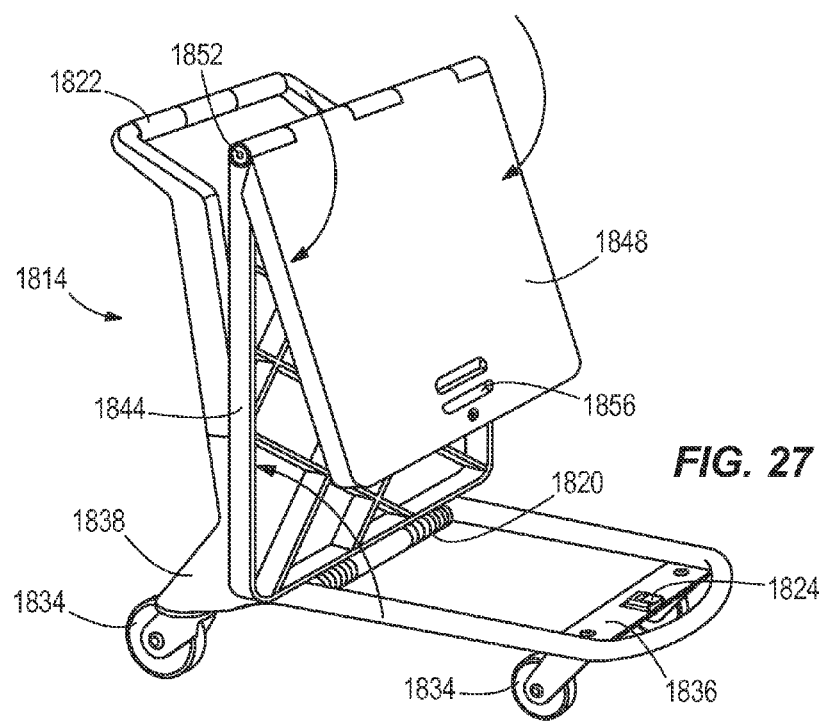
FIG. 27 is a perspective view of the flat-bed cart of FIG. 26 in an upright state.

FIGS. 26-27 disclose a nesting flat-bed cart 1810 with a folding deck 1816. The flat-bed cart 1810 of FIGS. 26-27 is similar to the flat-bed cart 1610 of FIG. 24, except that it is designed to support greater weights or loads. The deck 1816 includes a first or rear section 1844 pivotably coupled to the frame 1814, and a second or front section 1848 pivotably connected to the rear section 1844 by a hinge 1852. The deck 1816 folds along a lateral break line that is transverse to the longitudinal axis 1840 of the frame 1814, in a manner similar to a folding banquet table. The deck 1816 can pivot about the hinge 1852 when in a lowered position, which allows the flat-bed cart 1810 to accommodate bumps or rough surfaces over which the cart 1810 travels. In the illustrated embodiment, the front section 1848 and rear section 1844 include at least one hand grip 1856 for moving the deck 1816 between the upright and lowered positions, and the front section 1848 includes one or more casters 1860. In one embodiment, a single caster 1856 is used for supporting up to 2000 pounds and two casters 1856 are used for supporting up to 3000 pounds.

Various features of the invention are set forth in the following claims.

What is claimed is:

1. A shopping cart comprising:
a frame supported for movement over the ground, the frame including an upright portion including a pair of arms, each arm having an upper end, a lower end and an inner surface facing toward the opposite arm, the inner surfaces tapering inwardly toward one another such that the upper ends are positioned farther apart from each other than the lower ends;
a basket assembly connected to the upright portion of the frame, the basket assembly including a pair of side walls, each side wall including a slot, each slot having an outer surface slidable along the inner surface of one of the arms from the upper end to a predetermined position at which the inward taper of the inner surfaces provides an interference engagement between the basket assembly and the upright portion; and
a handle including a first end and a second end, the first end directly secured to the upper end of one arm, the second end directly secured to the upper end of the other arm, the handle securing the basket assembly against movement relative to the frame.

2. The shopping cart of claim 1, wherein the basket assembly is a first basket assembly and the frame is capable of supporting a plurality of basket assembly types, the first basket assembly defining a first basket assembly type and including a first mesh pattern, and the plurality of basket assembly types includes a second basket assembly type including a second mesh pattern.

3. The shopping cart of claim 1, wherein the basket assembly is a first basket assembly and the frame is capable of supporting a plurality of basket assembly types, the first basket assembly defining a first basket assembly type and defining a first basket wall cross-section, and the plurality of basket assembly types includes a second basket assembly type defining a second basket wall cross-section.

4. The shopping cart of claim 1, wherein the basket assembly is a first basket assembly and the frame is capable of supporting a plurality of basket assembly types, the first basket assembly defining a first basket assembly type and defining a first basket having a first size, and the plurality of basket assembly types includes a second basket assembly type defining a second basket having a second size.

5. The shopping cart of claim 1, wherein the frame further includes a base, wherein the upright portion is capable of supporting a plurality of basket assembly types.

6. The shopping cart of claim 1, wherein the frame is composed of plastic.

7. The shopping cart of claim 1, wherein the frame includes a housing and also includes a base extending substantially parallel to the ground, the base defining a ridge extending away from the ground, the housing including a removable insert, wherein when the cart is nested with a second cart, the insert engages a ridge on the second cart to lift a rear portion of the base.

8. The shopping cart of claim 4, wherein the second size is different from the first size.

9. The shopping cart of claim 7, wherein the housing extends toward a longitudinal axis extending between a front end of the frame and a rear end of the frame.

10. The shopping cart of claim 1, wherein the basket assembly includes a first basket slidable along the inner surface of the arms from the upper ends toward the lower ends and a second basket slidable along the inner surface of the arms from the upper ends toward the lower ends, the second basket positioned below the first basket.

* * * * *